US012776821B2

(12) United States Patent
Li et al.

(10) Patent No.: US 12,776,821 B2
(45) Date of Patent: Oct. 27, 2026

(54) ENHANCED BEAM MANAGEMENT BASED ON BEAM PREDICTION

(71) Applicant: QUALCOMM Incorporated, San Diego, CA (US)

(72) Inventors: Qiaoyu Li, Beijing (CN); Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 18/710,152

(22) PCT Filed: Jan. 21, 2022

(86) PCT No.: PCT/CN2022/073131
§ 371 (c)(1),
(2) Date: May 14, 2024

(87) PCT Pub. No.: WO2023/137691
PCT Pub. Date: Jul. 27, 2023

(65) Prior Publication Data
US 2025/0030475 A1 Jan. 23, 2025

(51) Int. Cl.
*H04B 7/06* (2006.01)
*H04W 72/21* (2023.01)

(52) U.S. Cl.
CPC ........ *H04B 7/06964* (2023.05); *H04W 72/21* (2023.01)

(58) Field of Classification Search
CPC .. H04B 7/06964; H04B 7/0695; H04B 7/088; H04W 72/21; H04W 72/046; H04W 76/15; H04W 76/19; H04L 1/1854
See application file for complete search history.

(56) References Cited

U.S. PATENT DOCUMENTS

2020/0366340 A1* 11/2020 Zhang .................. H04B 7/0408
2020/0404638 A1* 12/2020 Deogun ............... H04B 7/0617
(Continued)

FOREIGN PATENT DOCUMENTS

CN 111149306 A 5/2020
WO WO-2019032882 A1 2/2019
(Continued)

OTHER PUBLICATIONS

Supplementary European Search Report EP22921134 Search Authority Munich Sep. 17, 2025.
(Continued)

*Primary Examiner* — Chae S Lee
(74) *Attorney, Agent, or Firm* — Holland & Hart LLP/QUALCOMM Incorporated

(57) ABSTRACT

Methods, systems, and devices for wireless communication are described to support requesting a change to one or more beam management parameters based on a prediction of a change of a beam ranking at a user equipment (UE). The UE may transmit, to a base station, a medium access control-control element (MAC-CE) that includes a beam failure recovery (BFR) message. The BFR message may include a request to adjust a parameter associated with a beam management procedure for one or more secondary cell (SCells) used for communications with the UE. The request may include a request to change a parameter such as a periodicity of a beam management report, a periodicity of one or more beam management resources, a number of beam management resources, or any combination thereof.

30 Claims, 19 Drawing Sheets

(56) References Cited

U.S. PATENT DOCUMENTS

| | | | |
|---|---|---|---|
| 2021/0152235 A1 | 5/2021 | Zhou et al. | |
| 2021/0376909 A1 | 12/2021 | Khoshnevisan et al. | |
| 2022/0190883 A1 * | 6/2022 | Kaya .................. | H04B 7/06952 |

FOREIGN PATENT DOCUMENTS

| | | |
|---|---|---|
| WO | WO-2020214168 A1 | 10/2020 |
| WO | WO-2021008316 A1 | 1/2021 |
| WO | WO-2021097322 A1 | 5/2021 |
| WO | WO-2022005353 A1 | 1/2022 |

OTHER PUBLICATIONS

International Search Report and Written Opinion—PCT/CN2022/073131—ISA/EPO—Oct. 19, 2022.

ETSI: "5G, NR, Medium Access Control (MAC) protocol specification, 3GPP TS 38.321 version 16.1.0. Release 16", ETSI TS 138 321 V16.1.0, Jul. 31, 2020, 153 pages.

* cited by examiner

ENHANCED BEAM MANAGEMENT BASED ON BEAM PREDICTION

CROSS REFERENCE

The present application is a 371 national stage filing of International PCT Application No. PCT/CN2022/073131 by LI et al. entitled "ENHANCED BEAM MANAGEMENT BASED ON BEAM PREDICTION," filed Jan. 21, 2022, which is assigned to the assignee hereof, and which is expressly incorporated by reference in its entirety herein.

FIELD OF TECHNOLOGY

The following relates to wireless communication, including enhanced beam management based on beam prediction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station using one or more communication beams, which beams may periodically be updated or tested for communication quality.

SUMMARY

The described techniques relate to improved methods, systems, devices, and apparatuses that support enhanced beam management based on beam prediction. Generally, the described techniques provide for requesting a change to one or more beam management parameters based on a prediction of a change of a beam ranking at a user equipment (UE). For example, the UE may transmit, to a base station, a medium access control-control element (MAC-CE) that includes a beam failure recovery (BFR) message (e.g., may transmit a BFR MAC-CE). The BFR message may include a request to adjust a parameter associated with a beam management procedure for one or more secondary cell (SCells) used for communications with the UE. In some cases, the BFR message may additionally include a candidate beam report (e.g., for a BFR procedure). The request may include a request to change (e.g., increase or decrease) a parameter such as a periodicity of a beam management report, a periodicity of one or more beam management resources, a number of beam management resources, or any combination thereof. In some cases, the BFR message requesting to adjust the parameter(s) may be referred to as an enhanced BFR message, or an enhanced BFR MAC-CE.

A method for wireless communication at a UE is described. The method may include identify a probability of a change in a ranking of beams for wireless communications by the UE, transmitting, to a base station based on identifying the probability of the change in the ranking of the beams, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and performing the beam management procedure with the base station based on the request to adjust the parameter associated with the beam management procedure.

An apparatus for wireless communication is described. The apparatus may include a memory, a transceiver, and at least one processor of a UE, the at least one processor coupled with the memory and the transceiver. The at least one processor may be configured to cause the apparatus to identify a probability of a change in a ranking of beams for wireless communications by the UE, transmit, to a base station based on identifying the probability of the change in the ranking of the beams, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and perform the beam management procedure with the base station based on the request to adjust the parameter associated with the beam management procedure.

Another apparatus for wireless communication at a UE is described. The apparatus may include means for identify a probability of a change in a ranking of beams for wireless communications by the UE, means for transmitting, to a base station based on identifying the probability of the change in the ranking of the beams, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and means for performing the beam management procedure with the base station based on the request to adjust the parameter associated with the beam management procedure.

A non-transitory computer-readable medium storing code for wireless communication at a UE is described. The code may include instructions executable by a processor to identify a probability of a change in a ranking of beams for wireless communications by the UE, transmit, to a base station based on identifying the probability of the change in the ranking of the beams, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and perform the beam management procedure with the base station based on the request to adjust the parameter associated with the beam management procedure.

In some examples of the method, apparatuses, and non-transitory computer-readable medium described herein, the parameter may include operations, features, means, or instructions for a periodicity of reporting a measurement associated with the beam management procedure, a periodicity of a reference signal resource associated with the beam management procedure, and a number of reference signal resources associated with the beam management procedure.

Some examples of the method, apparatuses, and non-transitory computer-readable medium described herein may further include operations, features, means, or instructions for receiving signaling from the base station indicating that the UE may be to use BFR messages to request adjustments to the parameter, where transmitting the BFR message including the request to adjust the parameter may be based on receiving the signaling indicating that the UE may be to use BFR messages to request adjustments to the parameter.

Some examples of the method, apparatuses, and non-transitory computer-readable medium described herein may further include operations, features, means, or instructions for receiving signaling from the base station indicating a configuration for a type of scheduling request corresponding to BFR messages including requests to adjust the parameter, the type of scheduling request including a type of physical uplink control channel (PUCCH) message and transmitting a PUCCH message including a scheduling request according to the configuration for the type of scheduling request, the scheduling request including a request for resources for transmission of the BFR message.

In some examples of the method, apparatuses, and non-transitory computer-readable medium described herein, the one or more first SCells belong to a first subset of SCells of a set of multiple SCells and the first subset of SCells may be associated with using BFR messages to request adjustments to the parameter.

In some examples of the method, apparatuses, and non-transitory computer-readable medium described herein, a second subset of SCells of the set of multiple SCells may be associated with using BFR messages to transmit BFR reports, the second subset of SCells including the one or more second SCells.

Some examples of the method, apparatuses, and non-transitory computer-readable medium described herein may further include operations, features, means, or instructions for receiving signaling from the base station indicating that the one or more first SCells belong to the first subset of SCells associated with using BFR messages to request adjustments to the parameter.

Some examples of the method, apparatuses, and non-transitory computer-readable medium described herein may further include operations, features, means, or instructions for selecting, at the UE, the first subset of SCells, where the BFR message includes an indication that the one or more first SCells belong to the first subset of SCells associated with using BFR messages to request adjustments to the parameter.

In some examples of the method, apparatuses, and non-transitory computer-readable medium described herein, the BFR message includes an indication of the one or more first SCells in a bitmap associated with the set of multiple SCells or in a bitmap associated with the first subset of SCells.

In some examples of the method, apparatuses, and non-transitory computer-readable medium described herein, for a SCell of the one or more first SCells, the request to adjust the parameter may be indicated via a single bit associated with the SCell within the BFR message and an amount of adjustment to the parameter associated with the single bit may be configured prior to transmission of the BFR message.

In some examples of the method, apparatuses, and non-transitory computer-readable medium described herein, for a SCell of the one or more first SCells, the request to adjust the parameter may be indicated via multiple bits associated with the SCell within the BFR message, the multiple bits indicating an updated value for the parameter or an amount of adjustment to the parameter.

Some examples of the method, apparatuses, and non-transitory computer-readable medium described herein may further include operations, features, means, or instructions for receiving signaling from the base station indicating a first scheduling request resource corresponding to BFR messages requesting to adjust the parameter, the first scheduling request resource including a first PUCCH resource and transmitting, via the first scheduling request resource, a PUCCH message including a scheduling request, the scheduling request including a request for resources for transmission of the BFR message.

Some examples of the method, apparatuses, and non-transitory computer-readable medium described herein may further include operations, features, means, or instructions for receiving signaling from the base station indicating a second scheduling request resource corresponding to BFR messages including BFR reports, the second scheduling request resource including a second PUCCH resource.

In some examples of the method, apparatuses, and non-transitory computer-readable medium described herein, the scheduling request includes an indication of whether the scheduling request may be associated with the BFR message, a second BFR message including a BFR report, or both.

In some examples of the method, apparatuses, and non-transitory computer-readable medium described herein, transmitting the BFR message may include operations, features, means, or instructions for transmitting the BFR message to a primary cell (PCell), a SCell, or both.

Some examples of the method, apparatuses, and non-transitory computer-readable medium described herein may further include operations, features, means, or instructions for transmitting, to the base station, an indication of a quantity of SCells for which the UE supports using BFR messages to request adjustments to the parameter.

Some examples of the method, apparatuses, and non-transitory computer-readable medium described herein may further include operations, features, means, or instructions for transmitting an indication of a quantity of parameters for which the UE supports using BFR messages to request adjustments.

In some examples of the method, apparatuses, and non-transitory computer-readable medium described herein, identifying the probability of the change in the ranking of the beams may include operations, features, means, or instructions for using one or more machine learning models to determine the probability of the change in the ranking of the beams.

A method for wireless communication at a base station is described. The method may include receiving, from a UE, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and where the request to adjust the parameter is based on a probability of a change in a ranking of beams for wireless communications by the UE and performing the beam management procedure with the UE based on the request to adjust the parameter associated with the beam management procedure.

An apparatus for wireless communication is described. The apparatus may include a memory, a transceiver, and at least one processor of a base station, the at least one processor coupled with the memory and the transceiver. The at least one processor may be configured to cause the apparatus to receive, from a UE, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and where the request to adjust the parameter is based on a probability of a change in a ranking of beams for wireless communications by the UE and perform the beam management procedure with the UE based on the request to adjust the parameter associated with the beam management procedure.

Another apparatus for wireless communication at a base station is described. The apparatus may include means for receiving, from a UE, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and where the request to adjust the parameter is based on a probability of a change in a ranking of beams for wireless communications by the UE and means for performing the beam management procedure with the UE based on the request to adjust the parameter associated with the beam management procedure.

A non-transitory computer-readable medium storing code for wireless communication at a base station is described. The code may include instructions executable by a processor to receive, from a UE, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and where the request to adjust the parameter is based on a probability of a change in a ranking of beams for wireless communications by the UE and perform the beam management procedure with the UE based on the request to adjust the parameter associated with the beam management procedure.

In some examples of the method, apparatuses, and non-transitory computer-readable medium described herein, the parameter may include operations, features, means, or instructions for a periodicity of reporting a measurement associated with the beam management procedure, a periodicity of a reference signal resource associated with the beam management procedure, and a number of reference signal resources associated with the beam management procedure.

Some examples of the method, apparatuses, and non-transitory computer-readable medium described herein may further include operations, features, means, or instructions for transmitting signaling indicating that the UE may be to use BFR messages to request adjustments to the parameter, where receiving the BFR message including the request to adjust the parameter may be based on transmitting the signaling indicating that the UE may be to use BFR messages to request adjustments to the parameter.

Some examples of the method, apparatuses, and non-transitory computer-readable medium described herein may further include operations, features, means, or instructions for transmitting signaling to the UE indicating a configuration for a type of scheduling request corresponding to BFR messages including the request to adjust the parameter, the type of scheduling request including a type of PUCCH message and receiving a PUCCH message including a scheduling request according to the configuration for the type of scheduling request, the scheduling request including a request for resources for transmission of the BFR message.

In some examples of the method, apparatuses, and non-transitory computer-readable medium described herein, the one or more first SCells belong to a first subset of SCells of a set of multiple SCells and the first subset of second cells may be associated with using BFR messages to request adjustments to the parameter.

In some examples of the method, apparatuses, and non-transitory computer-readable medium described herein, a second subset of SCells of the set of multiple SCells may be associated with using BFR messages to transmit BFR reports, the second subset of SCells including the one or more second SCells.

Some examples of the method, apparatuses, and non-transitory computer-readable medium described herein may further include operations, features, means, or instructions for transmitting signaling to the UE indicating that the one or more first SCells belong to the first subset of SCells associated with using BFR messages to request adjustments to the parameter.

In some examples of the method, apparatuses, and non-transitory computer-readable medium described herein, the BFR message includes an indication that the one or more first SCells belong to the first subset of SCells associated with using BFR messages to request adjustments to the parameter.

In some examples of the method, apparatuses, and non-transitory computer-readable medium described herein, the BFR message includes an indication of the one or more first SCells in a bitmap associated with the set of multiple SCells or in a bitmap associated with the first subset of SCells.

In some examples of the method, apparatuses, and non-transitory computer-readable medium described herein, for a SCell of the one or more first SCells, the request to adjust the parameter may be indicated via a single bit associated with the SCell within the BFR message and an amount of adjustment to the parameter associated with the single bit may be configured prior to transmission of the BFR message.

In some examples of the method, apparatuses, and non-transitory computer-readable medium described herein, for a SCell of the one or more first SCells, the request to adjust the parameter may be indicated via multiple bits associated with the SCell within the BFR message, the multiple bits indicating an updated value for the parameter or an amount of adjustment to the parameter.

Some examples of the method, apparatuses, and non-transitory computer-readable medium described herein may further include operations, features, means, or instructions for transmitting signaling to the UE indicating a first scheduling request resource corresponding to BFR messages requesting to adjust the parameter, the first scheduling request resource including a first PUCCH resource and receiving, via the first scheduling request resource, a PUCCH message including a scheduling request, the scheduling request including a request for resources for transmission of the BFR message.

Some examples of the method, apparatuses, and non-transitory computer-readable medium described herein may further include operations, features, means, or instructions for transmitting signaling to the UE indicating a second scheduling request resource corresponding to BFR messages including BFR reports, the second scheduling request resource including a second PUCCH resource.

In some examples of the method, apparatuses, and non-transitory computer-readable medium described herein, the scheduling request includes an indication of whether the scheduling request may be associated with the BFR message, a second BFR message including a BFR report, or both.

In some examples of the method, apparatuses, and non-transitory computer-readable medium described herein, receiving the BFR message may include operations, features, means, or instructions for receiving the BFR message at a PCell, a SCell, or both.

Some examples of the method, apparatuses, and non-transitory computer-readable medium described herein may further include operations, features, means, or instructions for receiving, from the UE, an indication of a quantity of SCells for which the UE supports using BFR messages to request adjustments to the parameter.

Some examples of the method, apparatuses, and non-transitory computer-readable medium described herein may further include operations, features, means, or instructions for receiving an indication of a quantity of parameters for which the UE supports using BFR messages to request adjustments.

DETAILED DESCRIPTION

Figure 1:
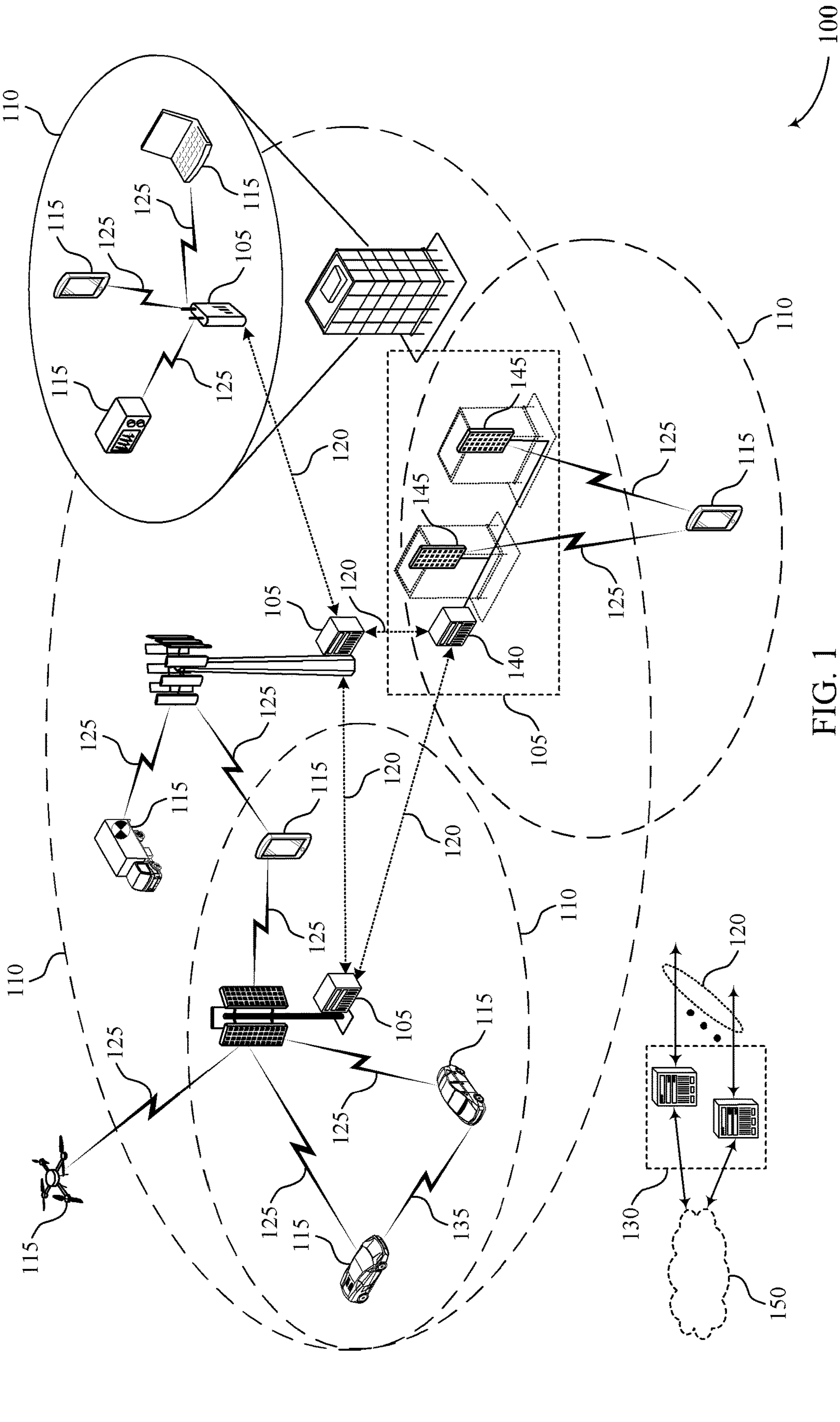
FIG. 1 illustrates an example of a wireless communications system that supports enhanced beam management based on beam prediction in accordance with aspects of the present disclosure.

A user equipment (UE) and a base station supporting a primary cell (PCell) for communications with the UE may periodically perform one or more beam management procedures to update beams (e.g., an order or rank of beams) used for communications between the UE and one or more secondary cells (SCells) associated with the PCell. As described herein, a cell (e.g., a PCell, an SCell) may refer to a base station or may refer to a portion (e.g., logical portion), component, entity (e.g., logical entity within the base station), or coverage area associated with the base station. In some cases, performing frequent beam management procedures may result in increased resource overhead and increased power consumption at the UE. For example, in some scenarios (e.g., stationary and/or low-speed scenarios) a top beam index may not change for a relatively long period of time, such that any resources or power used to update the beam may be considered extra overhead or power usage. In order to reduce overhead and/or UE power consumption, a periodicity of a beam management procedure may be increased (e.g., a beam management frequency may be decreased), and the UE may attempt to predict one or more parameters associated with beam management.

The UE may perform such predictions using an artificial intelligence based prediction. For example, in some cases, the UE may attempt to predict whether a top beam index (e.g., in a beam order or rank) may change (e.g., or may change more rapidly or dynamically) at a future time or within a future time window, which may support relatively larger periodicities between beam management procedures, reduced resource usage, or both. In some cases where beam management procedures have a higher periodicity for an SCell, the UE may predict that a top beam (e.g., beam index) for the SCell may change in a future time period (e.g., or may predict that a top beam may change more dynamically). In such cases, the UE may transmit, to the base station, a request for the base station to decrease beam management procedure periodicity (e.g., increase frequency) for the SCell, or a request to increase a number of beam management resources for the SCell.

For example, the UE may transmit, to the base station, a medium access control-control element (MAC-CE) that includes a beam failure recovery (BFR) message (e.g., may transmit a BFR MAC-CE). The BFR message may include a request to adjust a parameter associated with a beam management procedure for one or more SCells. In some cases, the BFR message may additionally include a candidate beam report (e.g., for a BFR procedure). The request may include a request to change (e.g., increase or decrease) a parameter such as a periodicity of a beam management report, a periodicity of one or more beam management resources, a number of beam management resources, or any combination thereof. Other adjustments to other beam management parameters may be included in the BFR message without departing from the scope of the present disclosure.

In some cases, the BFR message requesting to adjust the parameter(s) may be referred to as an enhanced BFR message, or an enhanced BFR MAC-CE. The BFR message may support requests to adjust (e.g., change) the parameter(s) on a per-cell basis, such that the parameter(s) may be adjusted for one or more identified SCells used for communications with the UE. Thus, beam management parameters may be adjusted on a per-cell basis to fit the requests of the UE, based on a predicted likelihood of a change in beam ranking for the UE. Based on the BFR message and the request to change one or more parameters, the UE and the base station may perform a beam management procedure (e.g., may perform a beam management procedure with and adjusted parameter), as described herein. The ability to dynamically update beam management parameters related to resource usage and periodicity may reduce power consumption and overhead usage at the UE, which may increase communication quality (e.g., among other benefits).

Aspects of the disclosure are initially described in the context of wireless communications systems. Aspects of the disclosure are further illustrated by and described with reference to cell configurations, reporting configurations, a process flow, apparatus diagrams, system diagrams, and flowcharts that relate to enhanced beam management based on beam prediction.

FIG. 1 illustrates an example of a wireless communications system 100 that supports enhanced beam management based on beam prediction in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (RS) (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may attempt to predict whether a top beam index (e.g., in a beam order or rank) may change (e.g., or may change more rapidly or dynamically) at a future time or within a future time window, which may support relatively larger periodicities between beam management procedures, reduced resource usage, or both. In some cases where beam management procedures have a higher periodicity for an SCell, the UE 115 may predict that a top beam (e.g., beam index) for the SCell may change in a future time period (e.g., or may predict that a top beam may change more dynamically). In such cases, the UE 115 may transmit, to a base station 105, a request for the base station 105 to change a beam management parameter for the SCell. The request may include a request to change (e.g., increase or decrease) a parameter such as a periodicity of a beam management report, a periodicity of one or more beam management resources, a number of beam management resources, or any combination thereof. In some cases, a BFR message may be used to request to adjust the parameter(s), which may be referred to as an enhanced BFR message, or an enhanced BFR MAC-CE.

Figure 2:
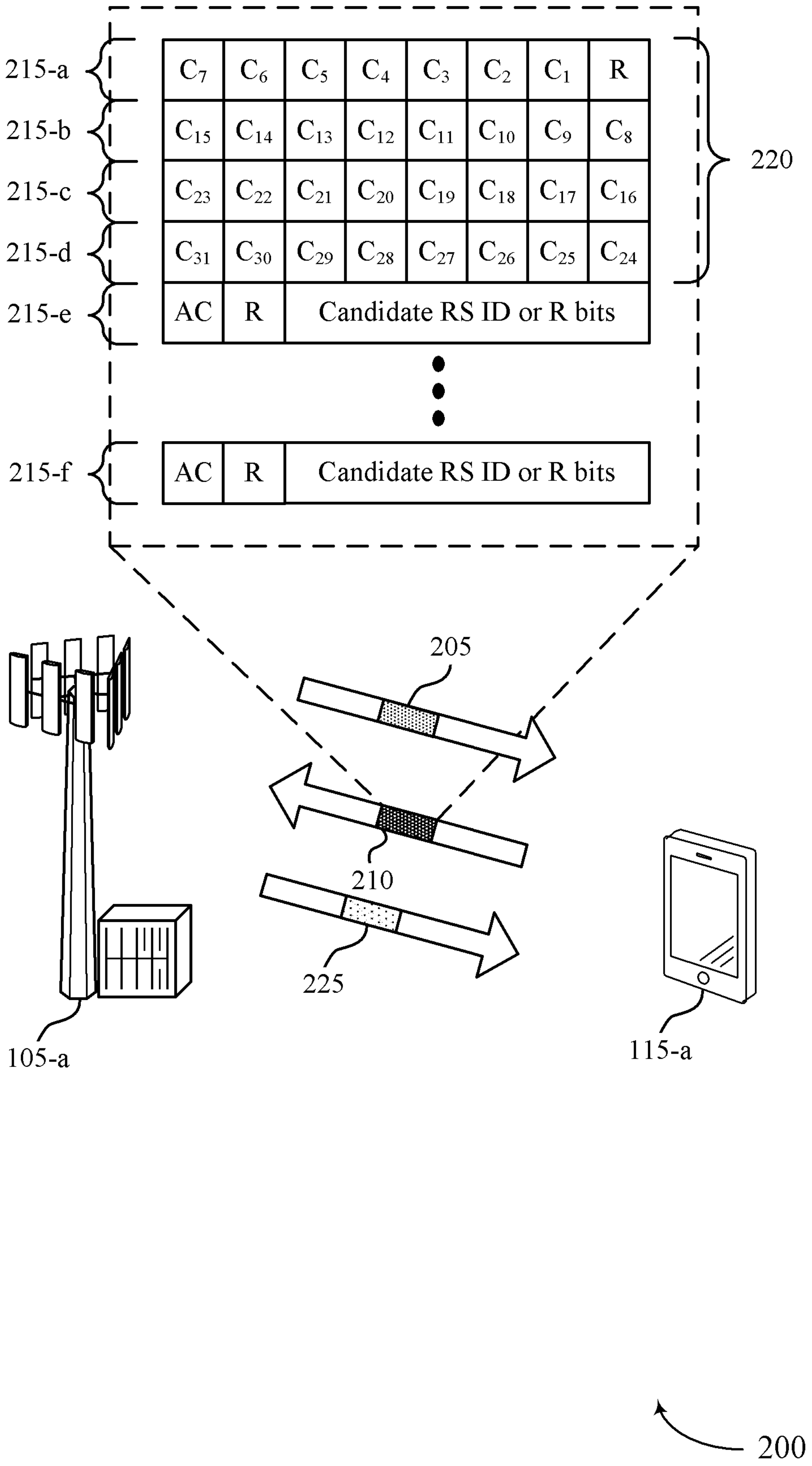
FIG. 2 illustrates an example of a wireless communications system that supports enhanced beam management based on beam prediction in accordance with aspects of the present disclosure.

FIG. 2 illustrates an example of a wireless communications system 200 that supports enhanced beam management based on beam prediction in accordance with aspects of the present disclosure. In some examples, wireless communications system 200 may implement or be implemented by one or more aspects of wireless communications system 100. For example, wireless communications system 200 may include a base station 105-*a* and a UE 115-*a*, which may be examples of a base station 105 and a UE 115 described with reference to FIG. 1. Base station 105-*a* and UE 115-*a* may communicate with each other using one or more communication beams (e.g., downlink beams, uplink beams), and may perform one or more management procedures to maintain an accuracy of the beam(s).

For example, base station 105-*a* and UE 115-*a* may perform a beam failure detection (BFD) procedure, where UE 115-*a* may monitor one or more BFD reference signals (BFD-RSs) 205 transmitted by base station 105-*a* (e.g., periodic CSI-RS(s), synchronization signal block(s) (SSB (s)) spatially quasi co-located with physical downlink control channel (PDCCH) demodulation reference signals (DMRSs)). Based on monitoring the BFD reference signal (s) 205, UE 115-*a* may assess (e.g., determine) whether a beam failure trigger condition is met.

Additionally or alternatively, UE 115-*a* and base station 105-*a* may identify new candidate beams for use in communications, where UE 115-*a* may monitor one or more beam identification reference signals 205 transmitted by base station 105-*a* (e.g., periodic CSI-RS(s) for beam management, SSB(s) within a serving cell). Based on monitoring the beam identification reference signal(s), UE 115-*a* may find (e.g., determine) one or more new candidate beams for communications with base station 105-*a*. When identifying new candidate beams, UE 115-*a* may measure a layer 1 (L1) reference signal received power (RSRP) metric for the beam identification reference signal(s) 205. In some cases, the beam identification reference signal(s) 205 may include CSI-RS(s), SSB(s), or some combination of CSI-RS(s) and SSB(s). A direct association may be configured between the beam identification reference signal resources (e.g., CSI-RS and/or SSB resources) and contention free random access resources.

In some cases, UE 115-*a* may transmit a BFR message 210 (e.g., BFR request) to base station 105-*a*, where the BFR message 210 may request performance of a BFR procedure (e.g., in response to performing a BFD procedure) and notifying base station 105-*a* of a beam failure on one or more beams. Transmission of a BFR request may be based on a condition, such as if a hypothetical block error rate (BLER) of a PDCCH is determined (e.g., counted) to be over a threshold more than a configured number of times. The BFR request (e.g., BFR message 210) may be transmitted via a contention free random access channel (RACH), and may be code division multiplexed (CDMed) with other RACH resources.

Upon transmitting a BFR request, UE 115-*a* may monitor for a response 225 from base station 105-*a*. For example, base station 105-*a* may transmit the response 225 via a PDCCH scrambled by a cell specific radio network temporary identifier (C-RNTI). A monitoring time window and a control resource set (CORESET) (e.g., QCLed with a beam indicated in the BFR request) for the response 225 may be configured by base station 105-*a* (e.g., via RRC signaling). UE 115-*a* may assume that DMRSs of a physical downlink shared channel (PDSCH) used for communications with base station 105-*a* may be QCLed with the beam indicated by the BFR request until being updated with one or more new transmission configuration indicator (TCI) states (e.g., by base station 105-*a*, in response to the BFR request). An unsuccessful BFR request may trigger one or more further radio link failure procedures.

A BFD procedure and associated BFR request may be performed for a PCell or an SCell, where the steps performed for the respective procedures may be based on whether the BFD and BFR are associated with a PCell or an SCell. For example, to perform BFD and a BFR request for an SCell, UE 115-*a* may first detect that one or more (e.g., all) downlink control beams have failed for the SCell (e.g., an SCell using frequency range 2 (FR2)). Such examples may be referred to as BFD, and may be based on BFD reference signals 205 transmitted by the SCell or may be based on a BLER or a PDCCH associated with UE 115-*a* and base station 105-*a*. As described herein, the BFD reference signals 205 may, in some examples, be periodic CSI-RS configured explicitly (e.g., via RRC signaling) or configured implicitly (e.g., by PDCCH TCI states).

If UE 115-*a* does not have an uplink grant available for transmission of a BFR request (e.g., upon identifying a beam failure), UE 115-*a* may transmit a link recovery request (LRR) via a PCell (e.g., using frequency range 1 (FR1)) or via another SCell (e.g., using FR2). The LRR may be transmitted via a physical uplink control channel (PUCCH) resource corresponding to the LRR (e.g., configured for the LRR). The PUCCH resource may be configured as a scheduling request (e.g., a regular scheduling request) having a specific PUCCH format (e.g., PUCCH format 0 or format 1). Uplink control information (UCI) multiplexing rules may also apply to transmission of the LRR via the PUCCH resource. Based on the LRR, the PCell (e.g., or the other SCell) may allocate an uplink grant for UE 115-*a* to report an index of the SCell associated with the beam failure (e.g., the failed SCell index). The uplink grant may be a normal uplink grant and may be scrambled with a C-RNTI and/or a modulation coding scheme (MCS) C-RNTI (MCS-C-RNTI).

Using the uplink grant (e.g., an already available uplink grant or a grant allocated in response to the LRR), UE 115-*a* may transmit a BFR message 210 (e.g., an SCell BFR MAC-CE) reporting the index of the SCell with the beam failure (e.g., the failed SCell index) and reporting a potential new candidate beam. In some cases, UE 115-*a* may refrain from reporting a new candidate beam if no candidate beam has an RSRP greater than a threshold. The PCell (e.g., or the other SCell) may reply to the BFR message 210 (e.g., the BFR request) with a BFR response 225, which may acknowledge reception of the BFR message 210. The BFR response 225 may indicate an uplink grant to schedule a new uplink transmission associated with a same HARQ process as a physical uplink shared channel (PUSCH) carrying the BFR message 210 (e.g., the MAC-CE).

A BFR message 210 for SCells (e.g., an SCell BFR MAC-CE) may have a same priority as a configured grant confirmation MAC-CE, and may include a bitmap 220 (e.g., $C_i$ fields) to indicate a respective index for each SCell associated with beam failure (e.g., each failed SCell). In some examples, the length of the bitmap 220 may be one octet 215 (e.g., set of eight bits) or four octets 215. If the bitmap 220 includes one octet 215, a highest serving cell index (e.g., a ServCellIndex) of a MAC entity associated with SCells configured for BFD may be eight. If the bitmap 220 includes one octet 215, a highest serving cell index (e.g., a ServCellIndex) of a MAC entity associated with SCells configured for BFD may be greater than or equal to eight.

The BFR message 210 may also include a respective octet 215 for each SCell, where the respective octets 215 may include one or more fields. A first field of an octet 215 (e.g., a one bit field, an 'AC' field) for a respective SCell may be included in the BFR message 210 to indicate whether or not a new candidate beam is available for the respective SCell. For example, the first field may have a value of '0' if a new candidate beam is not available or may have a value of '1' if a new candidate beam is available. If a new candidate beam is available, a second field (e.g., a six bit field, a candidate reference signal identifier (ID) field) may be included in the BFR message 210 (e.g., SCell BFR MAC-CE) for a respective failed SCell. The second field may be set to an index of a candidate reference signal in a candidate reference signal list (e.g., a candidate BeamRSSCellList), which candidate reference signal may be representative of, or associated with, the new candidate beam.

In some cases, the BFR message 210 may be a truncated SCell BFR MAC-CE. The truncated BFR MAC-CE may include the bitmap 220 (e.g., $C_i$ fields), which may be the same as the non-truncated format. However, octet(s) 215 that include a respective first field (e.g., candidate beam availability indication, AC field) and a respective second field (e.g., candidate reference signal ID field) for one or more corresponding SCells may be truncated in order to avoid exceeding a size remaining for the uplink grant resource. A logical channel ID (LCID) for the truncated BFR MAC-CE may also be different from an LCID for a non-truncated BFR MAC-CE.

In some cases, a BFR message 210 may include BFR information (e.g., a BFR request, candidate beam information), in addition to other information. For example, a BFR message 210 may additionally or alternatively include a request to change a parameter associated with a beam management procedure, such as a request to change a reporting periodicity, a resource periodicity, a number of configured resources, or any combination thereof. Such BFR messages 210, and their corresponding configurations, are further described with reference to FIGS. 3-7.

Figure 3:
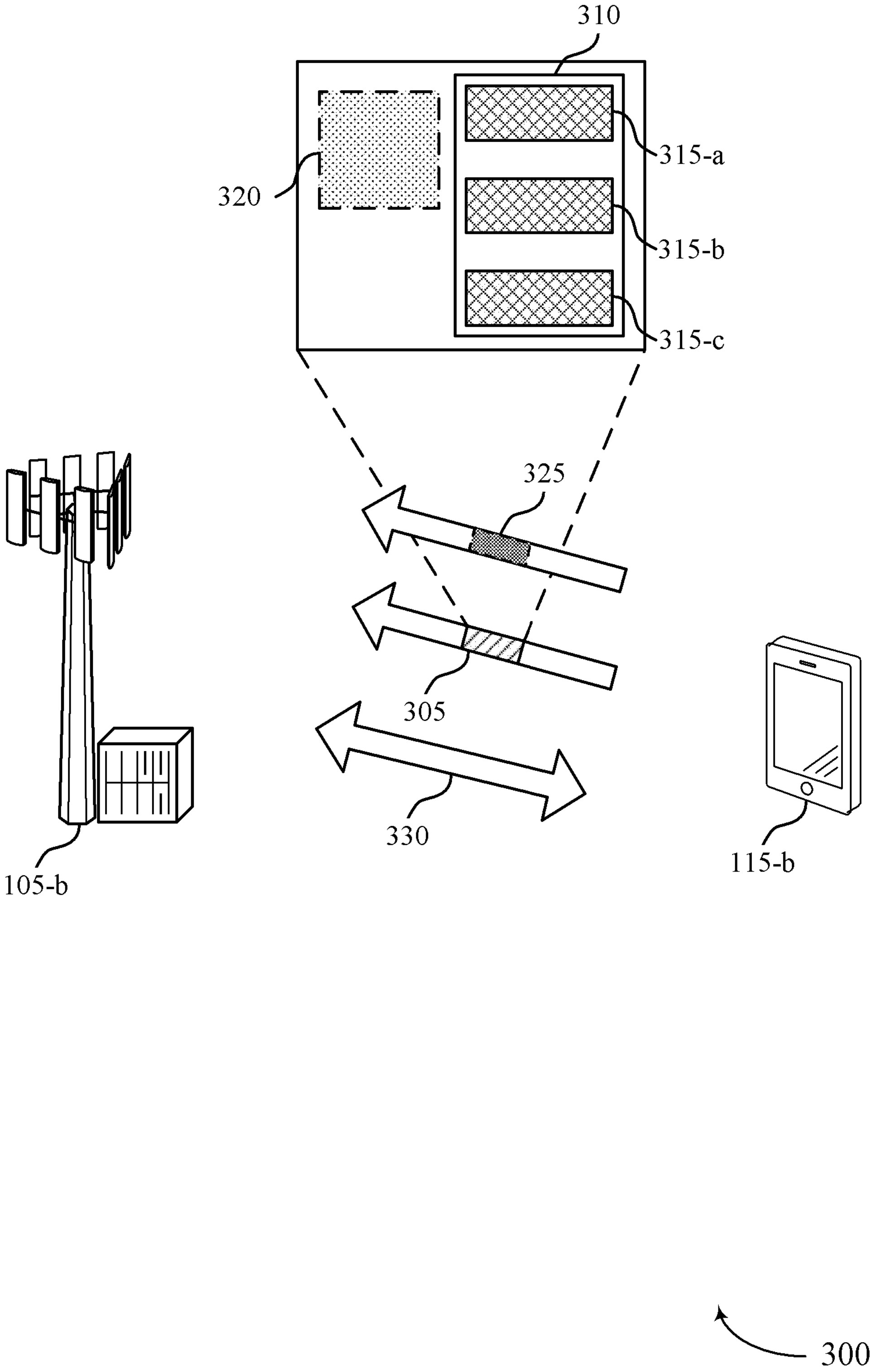
FIG. 3 illustrates an example of a wireless communications system that supports enhanced beam management based on beam prediction in accordance with aspects of the present disclosure.

FIG. 3 illustrates an example of a wireless communications system 300 that supports enhanced beam management based on beam prediction in accordance with aspects of the present disclosure. For example, wireless communications system 300 may include a base station 105-*b* and a UE 115-*b*, which may be examples of a base station 105 and a UE 115 described with reference to FIGS. 1 and 2. Base station 105-*b* may support a PCell for UE 115-*b*, where the PCell may be associated with one or more SCells used to communicate with UE 115-*b*. Base station 105-*b* and UE 115-*b* may communicate with each other (e.g., via the PCell, the SCells(s), or both) using one or more communication beams (e.g., downlink beams, uplink beams), and may perform one or more management procedures to maintain an accuracy of the beam(s), for example, as described with reference to FIG. 2.

In some cases, performing frequent beam management procedures (e.g., every 20 ms to 40 ms), such as beam management with RSRP reports for SSBs or for CSI resource indices (CRI) (e.g., ssb-Index-RSRP reporting or cri-RSRP reporting), may result in increased resource overhead (e.g., may consume UE-specific overheads, if used) and increased power consumption at UE 115-*b*. Further, in some scenarios (e.g., stationary and/or low-speed scenarios) a top beam index may not change for a relatively longer period of time, such as over hundreds of milliseconds. In order to reduce overhead and/or UE power consumption, a periodicity of a beam management procedure may be increased (e.g., a beam management frequency may be decreased), and UE 115-*b* may attempt to predict one or more parameters associated with beam management, beam management procedures, or both. UE 115-*b* may perform such predictions using an artificial intelligence based prediction (e.g., using an artificial intelligence model), such as via a long short term memory (LSTM) model or via a convolutional neural network (CNN).

For example, in some cases, UE 115-*b* may attempt to predict a top beam index (e.g., in a beam order or rank) at a future time (e.g., for extrapolation and/or interpolation), which may support relatively larger beam management procedure periodicities (e.g., hundreds of milliseconds). Additionally or alternatively, UE 115-*b* may attempt to predict whether a top beam index (e.g., in a beam order or rank) may change (e.g., or may change more rapidly or dynamically) at a future time or within a future time window, which may support relatively larger beam management procedure periodicities (e.g., hundreds of milliseconds) and/or reduced usage of CSI-RS resources, SSB resources, or both. For example, prediction of whether a top beam index may change in the future may support reduced resource usage by using 4 measured beams out of a total of 32 potential beams to predict a top beam. In some cases (e.g., if UE 115-*b* identifies a relatively stationary condition) beam management procedures (e.g., with ssb-Index-RSRP reporting or cri-RSRP reporting) may be suspended.

In some cases where beam management procedures have a higher periodicity for an SCell, UE 115-*b* may predict that a top beam (e.g., beam index) for the SCell may change in a future time period (e.g., or may predict that a top beam may change more dynamically). In such cases, UE 115-*b* may transmit, to base station 105-*b*, a request for base station 105-*b* to decrease beam management procedure periodicity (e.g., increase frequency) for the SCell or a request to increase a number of CSI-RS and/or SSB resources for the SCell. For example, UE 115-*b* may transmit, to base station 105-*b*, a MAC-CE that includes a BFR message 305 (e.g., may transmit a BFR MAC-CE) including a request 310 to adjust a parameter 315 associated with a beam management procedure for one or more SCells. In some cases, the BFR message 305 may additionally include a candidate beam report 320 (e.g., for a BFR procedure), for example, as described with reference to FIG. 2.

The request 310 may include a request to change (e.g., increase or decrease) a parameter 315-*a* such as a periodicity of a CSI report (e.g., a periodic or semi-persistently scheduled CSI report) associated with RSRP reporting for SSBs or for CRIs on one or more SCells (e.g., a CSI report with ssb-Index-RSRP or cri-RSRP as report quantities). Additionally or alternatively, the request 310 may include a request to change (e.g., increase or decrease) a parameter 315-*b* such as a periodicity of a CSI-RS resource (e.g., a periodic or semi-persistently scheduled CSI resource) or BFD-RS resource for a beam management procedure on the one or more SCells. Additionally or alternatively, the request 310 may include a request to change (e.g., increase or decrease) a parameter 315-*c* such as a number of CSI-RS and/or SSB resources (e.g., a number of resources, a number of resource sets, a number of ports) associated with a CSI report (e.g., a periodic or semi-persistently scheduled CSI report) that is associated with RSRP reporting for SSBs or for CRIs on one or more SCells (e.g., a CSI report with ssb-Index-RSRP or cri-RSRP as report quantities). Other adjustments to other beam management parameters may be included in the BFR message 305 without departing from the scope of the present disclosure.

In some cases, the BFR message 305 requesting to adjust the parameter(s) 315 may be referred to as an enhanced BFR message, or an enhanced BFR MAC-CE. The BFR message 305 may support request to adjust (e.g., change) the parameter(s) 315 on a per-cell basis, such that the parameter(s) 315 may be adjusted for one or more identified SCells used for communications with UE 115-*b*. Thus, beam management parameters may be adjusted on a per-cell basis to fit the requests of UE 115-*b*, based on a predicted likelihood of a change in beam ranking for UE 115-*b*. Based on the BFR message 305 and the request to change one or more parameters, UE 115-*b* and base station 105-*b* may perform a beam management procedure 330 (e.g., may perform a beam management procedure with and adjusted parameter), as described herein.

In some cases, an uplink grant may not be available for UE 115-*b* to transmit the BFR message 305 and UE 115-*b* may transmit a scheduling request 325 to request an uplink grant for the BFR message 305. In a first example, base station 105-*b* may configure a scheduling request 325 (e.g., a PUCCH scheduling request) that may be dedicated for the BFR message 305 (e.g., for the enhanced BFR message, the scheduling request 325 may be separately configured from an LRR), and UE 115-*b* may use the configured scheduling request 325. Additionally or alternatively, UE 115-*b* may use (e.g., reuse) an LRR for requesting an uplink grant for the BFR message 305.

In some cases, UE 115-*b* may be configured (e.g., by base station 105-*b*) with a dedicated scheduling request resource (e.g., PUCCH scheduling request resource) for requesting resources for the BFR message 305 (e.g., the enhanced BFR message). For example, UE 115-*b* may use the dedicated scheduling request resource to transmit a scheduling request 325 (e.g., a configured scheduling request 325 or an LRR) to request resources for the BFR message 305. In some cases, UE 115-*b* may be additionally configured with a scheduling request resource (e.g., PUCCH scheduling request resource) associated with a BFR MAC-CE used for candidate beam reporting (e.g., a conventional BFR MAC-CE). In some cases, the two different scheduling request resources may be configured with a same periodicity, such that UE 115-*b* may transmit the respective scheduling requests 325 with the same periodicity and base station 105-*b* may identify scheduling request reception opportunities (e.g., monitoring opportunities) using the same periodicity.

When configured with two different scheduling request resources, if UE 115-*b* determines to transmit a BFR MAC-CE used for candidate beam reporting (e.g., a conventional BFR MAC-CE), UE 115-*b* may transmit the associated scheduling request 325 using the resource configured for the conventional BFR MAC-CE. Similarly, if UE 115-*b* determines to transmit a BFR message 305 (e.g., an enhanced BFR MAC-CE), UE 115-*b* may transmit the associated scheduling request 325 using the resource configured for the enhanced BFR MAC-CE. If UE 115-*b* determines to transmit two separate BFR MAC-CEs (e.g., an enhanced BFR MAC-CE and a conventional BFR MAC-CE), UE 115-*b* may transmit the associated scheduling requests 325 separately, using the respective resource configured for each type of scheduling request 325.

In some cases, the scheduling request 325 for the BFR message 305 (e.g., for any BFR message) may include an additional payload (e.g., of at least 2 bits), for example, instead of the above-described configuration of different scheduling request resources. In such cases, the payload may indicate whether the associated scheduling request 325 is associated with a conventional BFR MAC-CE, an enhanced BFR MAC-CE, or both. In some cases, two different MAC-CEs (e.g., including BFR messages) may be reported by UE 115-*b*, where a first MAC-CE may be associated with conventional BFR (e.g., candidate beam reporting) and a second MAC-CE ay be associated with beam prediction parameter update(s). The two different MAC-CEs may have a same format or may have different formats (e.g., which may depend on a use for the MAC-CE).

UE 115-*b* may transmit (e.g., report) the BFR message 305 to the PCell supported by base station 105-*b*, or to an associated SCell (e.g., one of the SCells associated with the PCell). Similarly, a scheduling request resource corresponding to the BFR message 305 may be associated with the PCell or with one of the SCells.

Figure 4A:
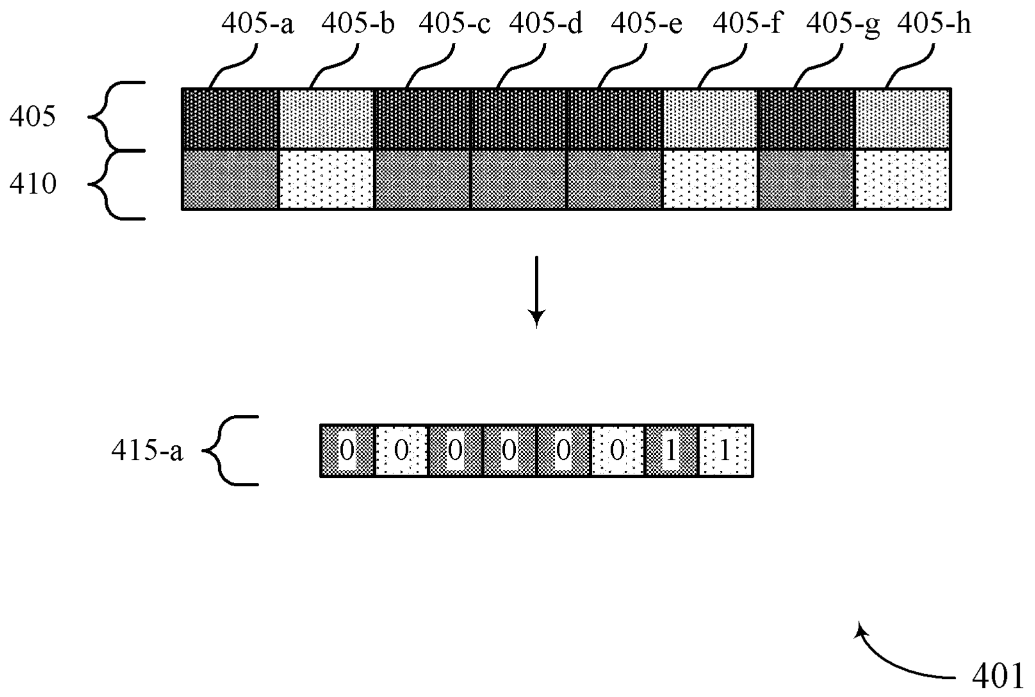
FIGS. 4A and 4B illustrate examples of cell configurations that support enhanced beam management based on beam prediction in accordance with aspects of the present disclosure.
Figure 4B:
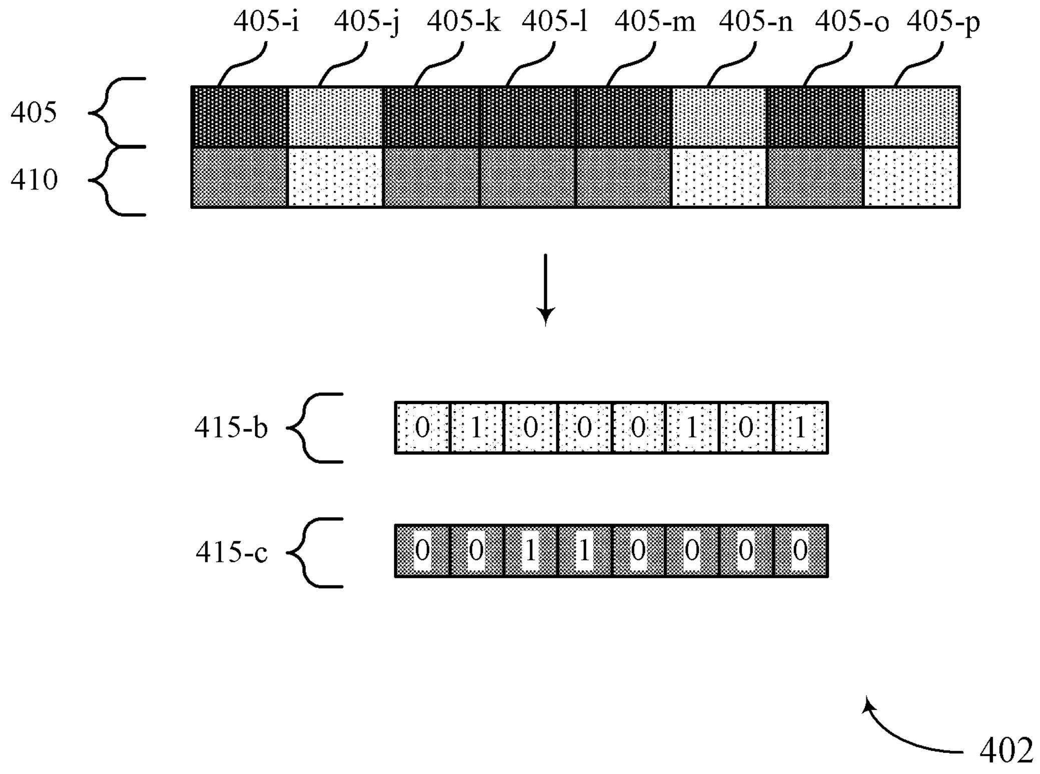

FIGS. 4A and 4B illustrate examples of cell configurations 401 and 402 that support enhanced beam management based on beam prediction in accordance with aspects of the present disclosure. In some examples, cell configurations 401 and 402 may implement or be implemented by aspects of wireless communications system 100 or 300. For example, cell configuration 401 or cell configuration 402, or both, may be implemented by a base station 105 and a UE 115 to request changes to a beam management parameter (e.g., as described with reference to FIG. 3), where the base station 105 and the UE 115 may be examples of a base station 105 and a UE 115 described with reference to FIGS. 1-3.

As described herein, multiple SCells 405 may be associated with a PCell supported by the base station 105 and used for wireless communications with the UE 115. One or multiple of the SCells 405 may be identified in a BFR message (e.g., a BFR MAC-CE), such as a BFR message that conveys a request to adjust a parameter associated with a beam management procedure for the SCell(s) 405 (e.g., an enhanced BFR message). In some cases, the BFR message may also convey information regarding candidate beam selection for one or more of the SCells 405 (e.g., SCells 405 configured for parameter adjustment via a BFR message, SCells 405 not configured for the parameter adjustment). For example, in a same BFR message (e.g., an enhanced BFR message), the UE 115 may report a candidate beam for a first SCell 405 (e.g., if beam failure is detected for the first SCell 405), while the UE 115 may also request a change in a parameter (e.g., increased or decreased beam management periodicity) for a second SCell 405 (e.g., as identified by the UE 115, such as using a machine learning model).

Different SCells 405 may be configured or associated with different operation modes regarding the enhanced BFR message. For example, one or more first SCells 405 may be associated with operating in a beam prediction parameter update mode (e.g., Mode-2, using a BFR message to request a change or update to a parameter). Similarly, one or more second SCells 405 may be associated with operating in a conventional candidate beam report mode (e.g., Mode-1, using a BFR message for BFR requests and candidate beam information and not for parameter updates). In some cases, the one or more second SCells 405 may be able to support an enhanced BFR message, but may not be configured to receive and act on an enhanced BFR message. In some cases, the one or more first SCells 405 may be configured to support the enhanced BFR message based on being equipped with a newer release base station 105 that may distribute one or more artificial intelligence models, while the one or more second SCells 405 may be configured to not support the enhanced BFR message based on being equipped with an older release base station 105 that may not distribute one or more artificial intelligence models.

In some cases, for a respective SCell 405 configured for parameter adjustment requests via BFR messages (e.g., configured for enhanced BFR messages), both a conventional candidate beam report (e.g., Mode-1) and a beam prediction parameter update report (e.g., Mode-2) may be included in a same BFR message (e.g., a same BFR MAC-CE). For example, the UE 115 may report, for a same SCell 405, a BFR request and a candidate beam in a first portion of the BFR message and a beam prediction parameter update in a second portion of the BFR message. In some other cases, a respective SCell 405 configured for parameter adjustment requests via BFR messages (e.g., configured for enhanced BFR messages) may include one report (e.g., a conventional candidate beam report or a beam prediction parameter update report) in a BFR message (e.g., and may not include the other type of report).

A mode used by a respective SCell 405 (e.g., a mode used in the BFR message to report a parameter adjustment request and/or candidate beam information) may be based on a cell configuration 401 or 402 as described herein. In a first example, as illustrated in FIG. 4A, the base station 105 may configure a respective mode of operation 410, and an associated reporting mode for the BFR message, for each SCell 405 (e.g., previous to transmission of a BFR message). For example, the base station 105 may configure SCells 405-*a*, 405-*c*, 405-*d*, 405-*e*, and 405-*g* to support parameter adjustment via a BFR message (e.g., to support an enhanced BFR message, which may also include candidate beam information for the indicated SCells 405). Similarly, the base station 105 may configure SCells 405-*b*, 405-*f*, and 405-*h* to support reception of candidate beam information via a BFR message (e.g., and not to support enhanced BFR messages).

In some cases, the configuration of the SCells 405 may be based on one or more recommendations from the UE 115 (e.g., prior to cell configuration by the base station 105). In some cases, the SCells 405 supporting the enhanced BFR (e.g., beam prediction modes) may also be configured (e.g., by the base station 105) with one or more artificial intelligence models for beam prediction.

Using, or based on, the cell configuration 401, the UE 115 may report a single bitmap 415-*a* for the SCells 405 (e.g., in the BFR message, similar to a conventional BFR MAC-CE). In such cases, a bit associated with an SCell 405 configured for conventional BFR reports (e.g., configured for BFR requests and candidate beam information) may indicate whether beam failure is being reported by the UE 115. Similarly, a bit associated with an SCell 405 configured for enhanced BFR reports (e.g., configured for beam management parameter updates, beam prediction mode) may indicate whether one or more beam prediction parameters are requested to be updated for the SCell 405. For example, a first bit of the bitmap 415-*a* may indicate whether a parameter update is requested for SCell 405-*a*, based on SCell 405-*a* being configured for enhanced BFR messages. Similarly, a second bit of the bitmap 415-*a* may indicate whether beam failure is being reported for SCell 405-*b*, based on SCell 405-*b* being configured for conventional BFR messages, and so on.

In a second example, as illustrated in FIG. 4B, the UE 115 may select a respective mode of operation 410, and an associated reporting mode for the BFR message, for each SCell 405 and may indicate the modes of operation via the BFR message. For example, the UE 115 may select SCells 405-*i*, 405-*k*, 405-1, 405-*m*, and 405-*o* to indicate a parameter adjustment via a BFR message (e.g., to support an enhanced BFR message, which may also include candidate beam information for the indicated SCells 405). Similarly, the UE 115 may select SCells 405-*j*, 405-*n*, and 405-*p* to indicate reception of candidate beam information via a BFR message (e.g., and not to support enhanced BFR messages).

Using, or based on, the cell configuration 402, the UE 115 may report two bitmaps 415 (e.g., bitmaps 415-*b* and 415-*c*) for the SCells 405 (e.g., in the BFR message). In such cases, a first bitmap 415-*b* may be associated with SCells 405 using conventional BFR messages and a second bitmap 415-*c* may be associated with SCells 405 using enhanced BFR messages. Thus, a bit in bitmap 415-*b* may indicate whether beam failure is being reported by the UE 115 for the corresponding SCell 405. Similarly, a bit in bitmap 415-*c* may indicate whether one or more beam prediction parameters are requested to be updated for the corresponding SCell 405. For example, a first bit of the bitmap 415-*c* may indicate whether a parameter update is requested for SCell 405-*i*, based on SCell 405-*i* being configured for enhanced BFR messages. Similarly, a second bit of the bitmap 415-*b* may indicate whether beam failure is being reported for SCell 405-*j*, based on SCell 405-*j* being configured for conventional BFR messages, and so on.

Figure 5A:
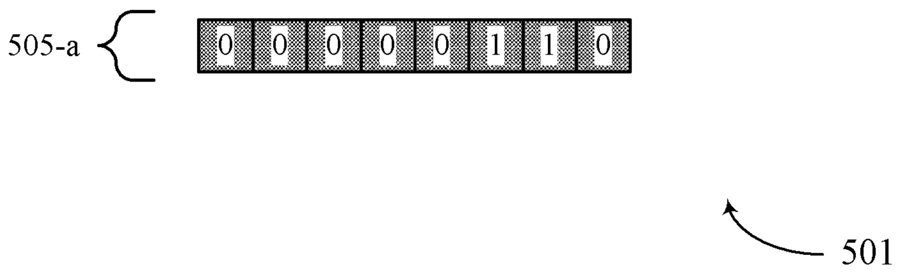
FIGS. 5A, 5B, and 5C illustrate example of reporting configurations that support enhanced beam management based on beam prediction in accordance with aspects of the present disclosure.
Figure 5B:
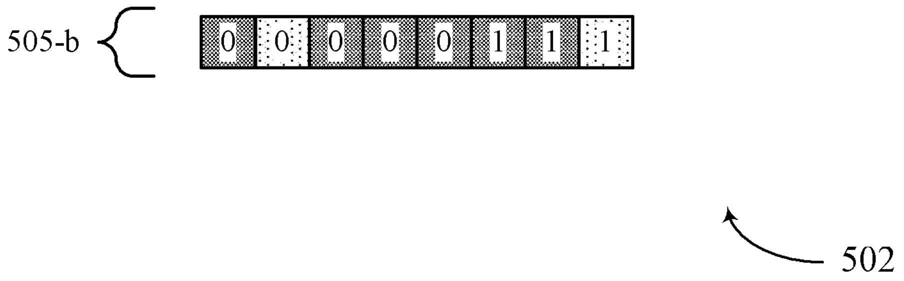
Figure 5C:
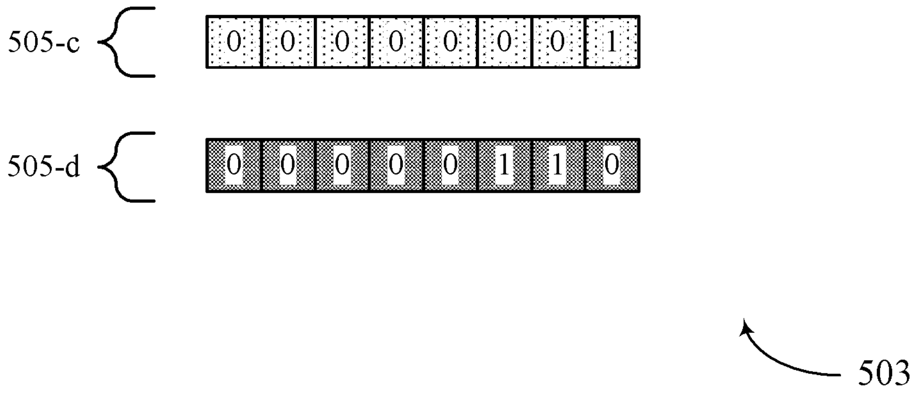

FIGS. 5A, 5B, and 5C illustrate examples of reporting configurations 501, 502, and 503 that support enhanced beam management based on beam prediction in accordance with aspects of the present disclosure. In some examples, reporting configurations 501, 502, and 503 may implement or be implemented by aspects of wireless communications system 100 or 300. For example, reporting configuration 501, reporting configuration 502, reporting configuration 503, or any combination thereof, may be implemented by a base station 105 and a UE 115 to request changes to a beam management parameter (e.g., as described with reference to FIG. 3), where the base station 105 and the UE 115 may be examples of a base station 105 and a UE 115 described with reference to FIGS. 1-4B.

As described with reference to FIG. 3, the UE 115 may request an update to a beam management parameter (e.g., via an enhanced BFR message, enhanced BFR MAC-CE), which may include requesting a change (e.g., increase or decrease) to a reporting periodicity, a beam management resource periodicity, a number of beam management resources, or any combination thereof. In some cases, the base station 105 may configure the UE 115 (e.g., via signaling, such as RRC signaling) to report the beam prediction parameter update(s) in enhanced BFR messages. In such cases, the UE 115 may request an update to one or more parameters, via an enhanced BFR message, based on being configured to report the beam prediction parameter update(s) in enhanced BFR messages.

As described with reference to FIGS. 4A and 4B, an enhanced BFR message may include one or more bitmaps 505, where each bit in the bitmap(s) 505 may indicate whether a respective SCell is flagged in the BFR message for requesting a parameter update and/or reporting BFR.

In a first example, as illustrated by FIG. 5A, the BFR message (e.g., enhanced BFR message) may be used in a standalone manner, such that the BFR message may not include information regarding conventional BFR (e.g., may not include BFR request(s) and candidate beam information). In such cases, a bitmap 505-*a* of the BFR message may indicate whether SCells are requested to be updated with one or more new beam prediction parameters in the BFR message. For example, a first bit of the bitmap 505-*a* may indicate whether a corresponding first SCell is requested to be updated with new beam prediction parameter(s) in the BFR message, a second bit of the bitmap 505-*a* may indicate whether a corresponding second SCell is requested to be updated with new beam prediction parameter(s) in the BFR message, and so on.

In a second example, as illustrated by FIG. 5B, the BFR message (e.g., enhanced BFR message) may be include information regarding conventional BFR (e.g., BFR request (s) and candidate beam information) for one or more SCells not configured for the enhanced BFR message. In this example, each SCell may be configured with a corresponding operational mode, as described with reference to FIG. 4A. As such, a bitmap 505-*b* of the BFR message may indicate whether SCells are requested to be updated with one or more new beam prediction parameters or are reported with beam failure in the BFR message, based on the corresponding mode configured for the respective SCell. For example, a first bit of the bitmap 505-*b* may indicate whether a corresponding first SCell is requested to be updated with new beam prediction parameter(s) in the BFR message, based on the first SCell being configured for beam predication parameters. Similarly, a second bit of the bitmap 505-*b* may indicate whether a corresponding second SCell is reported with beam failure in the BFR message, based on the second SCell being configured for conventional BFR reporting, and so on.

In a third example illustrated by FIG. 5C, the BFR message (e.g., enhanced BFR message) may be include information regarding conventional BFR (e.g., BFR request (s) and candidate beam information) for one or more SCells not configured for the enhanced BFR message. In this example, each SCell may be not be configured or limited to a corresponding operational mode (e.g., which may be selected by the UE 115 as described with reference to FIG. 4B). As such, the BFR message may include two bitmaps 505 (e.g., bitmaps 505-*c* and 505-*d*). A bitmap 505-*c* of the BFR message may indicate whether SCells are reported with beam failure in the BFR message, where the bitmap 505-*c* may be associated with SCells using conventional BFR reporting. A bitmap 505-*d* of the BFR message may indicate whether SCells are requested to be updated with one or more new beam prediction parameters, where the bitmap 505-*d* may be associated with SCells using enhanced BFR reporting.

In this example, a first bit of the bitmap 505-*d* may indicate whether a corresponding first SCell is requested to be updated with new beam prediction parameter(s) in the BFR message, and so on. Similarly, a first bit of the bitmap 505-*c* may indicate whether a corresponding first SCell is reported with beam failure in the BFR message, and so on.

Figure 6A:
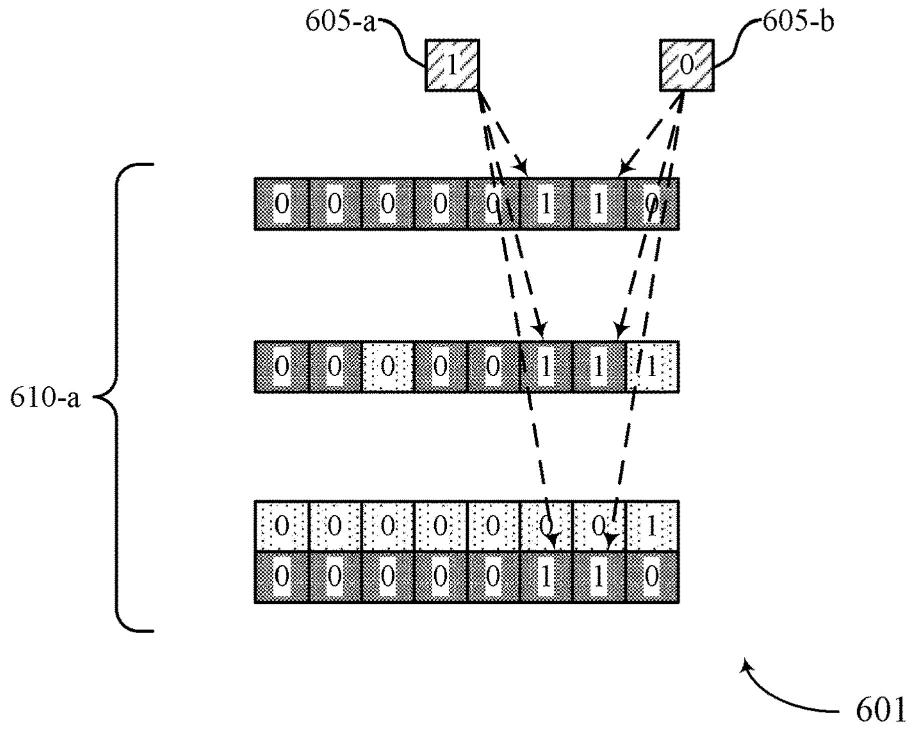
FIGS. 6A and 6B illustrate examples of reporting configurations that support enhanced beam management based on beam prediction in accordance with aspects of the present disclosure.
Figure 6B:
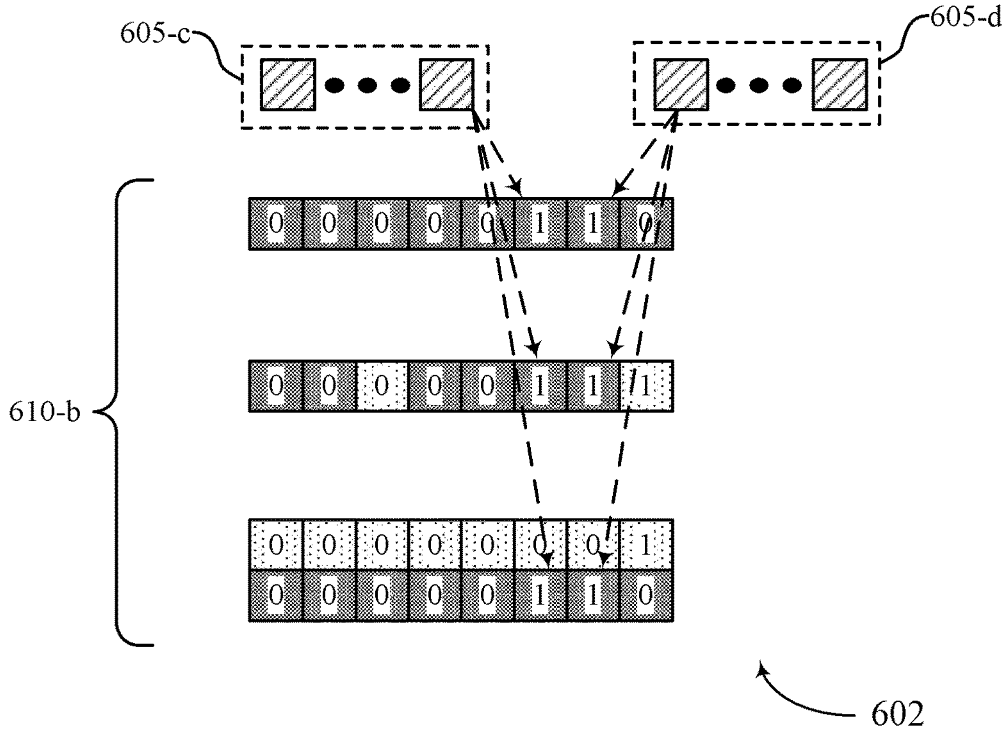

FIGS. 6A and 6B illustrate examples of reporting configurations 601 and 602 that support enhanced beam management based on beam prediction in accordance with aspects of the present disclosure. In some examples, reporting configurations 601 and 602 may implement or be implemented by aspects of wireless communications system 100 or 300. For example, reporting configuration 601 or reporting configuration 602, or both, may be implemented by a base station 105 and a UE 115 to request changes to a beam management parameter (e.g., as described with reference to FIG. 3), where the base station 105 and the UE 115 may be examples of a base station 105 and a UE 115 described with reference to FIGS. 1-5C.

As described with reference to FIG. 3, the UE 115 may request an update to a beam management parameter (e.g., via an enhanced BFR message, enhanced BFR MAC-CE), which may include requesting a change (e.g., increase or decrease) to a reporting periodicity, a beam management resource periodicity, a number of beam management resources, or any combination thereof. Reporting configurations 601 and 602 may illustrate one or more fields 605 that may be used to request an increase to the parameter, a decrease to the parameter, an amount of increase or decrease to the parameter, or any combination thereof. Each field 605 may correspond to a respective SCell, which may be indicated in a bitmap 610 of the BFR message as requesting an updated parameter. The bitmap 610 may represent any bitmap described herein (e.g., with reference to FIGS. 4A-5C), or any combination of bitmaps described herein.

In a first example, as illustrated by FIG. 6A, the BFR message may include one-bit fields 605 to indicate a respective increase or decrease to a beam management parameter. For example, based on an indication in a bitmap 610-*a* of the BFR message, one bit may be reported in a field 605 to indicate an increase or decrease in a beam predication parameter of a corresponding SCell.

The amount of the increase or decrease may be configured by the base station 105 or may be defined for the UE 115 and the base station 105 (e.g., in a wireless communications standard). The parameter indicated to be increased or decreased by the field 605 may also be configured by the base station or may be defined for the UE 115 and the base station 105 (e.g., in a wireless communications standard). The respective bit used for each field 605 of the BFR message (e.g., the field 605 or bit associated with a certain SCell) may be based on a partitioning of bits within one or more octets of the BFR message (e.g., partitioning of reserved or reference signal ID bits), such that each bit (e.g., each field 605) may be associated with a respective SCell.

In one example, a field 605-*a* may be associated with a sixth SCell indicated in the bitmap 610-*a* of the BFR message and a field 605-*b* may be associated with a seventh SCell indicated in the bitmap 610-*a* of the BFR message, where the bitmap 610-*a* may indicate that an updated parameter is requested for the sixth and seventh SCells. In this example, the sixth SCell may be associated with a number of CSI reports (e.g., with three CSI reports, such as periodic or semi-persistently scheduled CSI reports), and the base station 105 may have configured that reported periodicity increases or decreases for the sixth SCell (e.g., as indicated by the field 605-*a*) are associated with a second CSI report of the CSI reports. Similarly, the base station 105 may have configured a reported periodicity increase or decrease for the seventh SCell (e.g., as indicated by the field 605-*b*) to be associated with a respective CSI report or CSI resource.

The UE 115 may determine to request an increase in the periodicity of the second CSI report, and may therefore include a '1' in the field 605-*a*, which may indicate a request to increase the periodicity of the related CSI report. Similarly, the UE 115 may determine to request a decrease in the periodicity associated with field 605-*b*, and may therefore include a '0' in the field 605-*b*, which may indicate a request to decrease the periodicity of the related CSI report.

In a second example, as illustrated by FIG. 6B, the BFR message may include multiple bit fields 605 to indicate a respective increase or decrease to a beam management parameter. For example, based on an indication in a bitmap 610-*b* of the BFR message, multiple bits may be reported in a field 605 to indicate an increase or decrease in a beam predication parameter of a corresponding SCell, as well as an amount of the increase or decrease.

For example, multiple bits may be used to report an updated value (e.g., exact value), or a change to a value, for one or more beam management parameters associated with a respective SCell. The parameter(s) associated with the field (e.g., the parameters indicated to be updated using the field 605) may be configured by the base station 105, or may be defined for the UE 115 and the base station 105 (e.g., in a wireless communications standard).

In one example, a field 605-*c* may be associated with a sixth SCell indicated in the bitmap 610-*b* of the BFR message and a field 605-*d* may be associated with a seventh SCell indicated in the bitmap 610-*b* of the BFR message, where the bitmap 610-*b* may indicate that an updated parameter is requested for the sixth and seventh SCells. In this example, the sixth SCell may be associated with a periodic CSI report associated with four resources or resource sets (e.g., CSI-RS and/or SSB resources) with different periodicities, where the base station 105 may have configured that reported periodicity increases or decreases for the sixth SCell (e.g., as indicated by the field 605-*c*) are associated with a third resource (e.g., or resource set) of the resources. Similarly, the base station 105 may have configured a reported periodicity increase or decrease for the seventh SCell (e.g., as indicated by the field 605-*d*) to be associated with a respective CSI report or CSI resource.

The UE 115 may determine to request an increase in the periodicity of the third resource and may determine that the periodicity should be increased to a certain value. The UE 115 may report the determined value in the field 605-*c*, for example, using the multiple bits of the field 605-*c*. Similarly, the UE 115 may determine to request an increase or decrease in the periodicity associated with field 605-*d*, and may report a value of the increase or decrease in the field 605-*d*.

In some cases, the multiple-bit fields 605 used to report the updated parameter value (e.g., or the change in the value) may be a candidate beam reference signal ID field (e.g., from a conventional BFR message). In such cases, the fields 605 may have a size of six bits each, or a similar size based on a size of the candidate beam reference signal ID field. In some cases, abeam failure field (e.g., 'AC' field) and/or a reserved bit field, together with the candidate beam reference signal ID field, may be used to indicate the parameter update (e.g., resulting in more available bits, such as 7 bits or 8 bits).

In some cases, a multiple-bit field 605 associated with a respective SCell may be partitioned, such that multiple parameter updates (e.g., exact values or changes in values) for the respective SCell may be indicated using the field 605. In some cases, a multiple-bit field 605 associated with a respective SCell may be partitioned to report two portions of information. For example, a first portion of the field 605 may indicate one or more parameters (e.g., types of parameters) that are reported in a second portion of the field. The second portion may report an updated value (e.g., or change in value) of the indicated parameter(s) (e.g., based on a bitmap or a combinatorial number). In such cases, a respective number of bits included in the first portion and the second portion may be configured by the base station 105, or may be defined for the UE 115 and the base station 105 (e.g., in a wireless communications standard). The respective number of bits included in the first portion and the second portion may, for example, be based on a total number of parameters and a number of parameters to be indicated via the field 605.

In some cases, a multiple-bit field 605 may be a two bit field, and the field 605 may be used to indicate one of three possibilities for updating the parameter, such as indicating an increase, a decrease, or no change.

Figure 7:
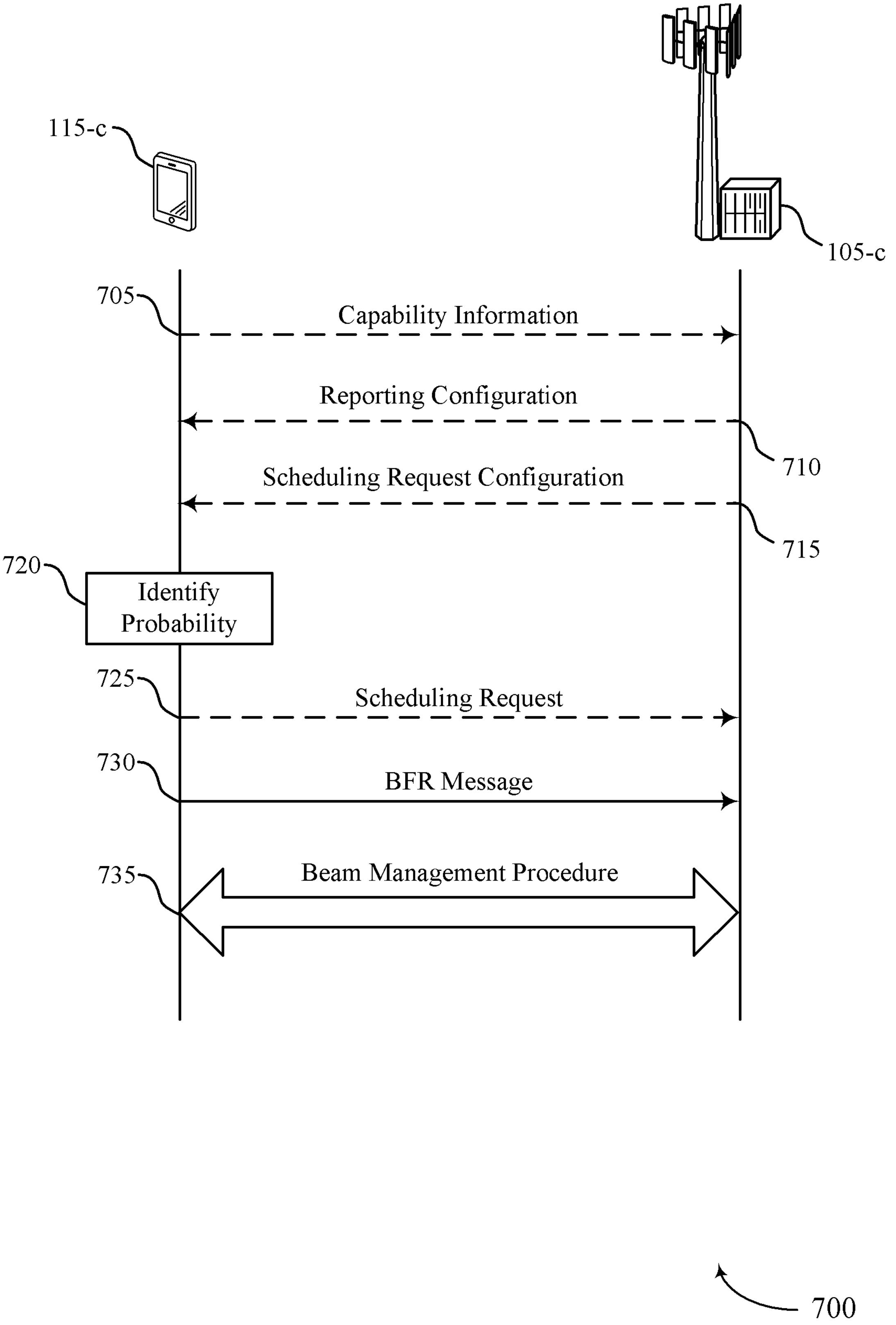
FIG. 7 illustrates an example of a process flow that supports enhanced beam management based on beam prediction in accordance with aspects of the present disclosure.

FIG. 7 illustrates an example of a process flow 700 that supports enhanced beam management based on beam prediction in accordance with aspects of the present disclosure. In some examples, process flow 700 may implement or be implemented by one or more aspects of wireless communications system 100 or 300. For example, process flow 700 may be implemented by a UE 115-*c* and a base station 105-*c*, which may be examples of a UE 115 and a base station 105 described with reference to FIGS. 1-6.

In the following description of process flow 700, the operations may be performed in a different order than the order shown, or the operations performed by UE 115-*c* and base station 105-*c* may be performed in different orders or at different times. For example, some operations may also be left out of process flow 700, or other operations may be added to process flow 700. Although UE 115-*c* and base station 105-*c* are shown performing the operations of process flow 700, some aspects of some operations may also be performed by one or more other wireless devices. For example, some actions shown as being performed by base station 105-*c* may be performed by another base station 105.

At 705, in some cases, UE 115-*c* may transmit, to base station 105-*c* an indication of one or more capabilities for UE 115-*c* to request a change in beam management parameter(s) via a BFR message (e.g., a BFR MAC-CE). In some cases, one or more configurations for SCells and/or for the BFR message (e.g., enhanced BFR message) may be based on the capabilities indicated by UE 115-*c*.

In some cases, UE 115-*c* may report a number (e.g., maximum number) of SCells that may be operated with beam prediction parameter updates. In a first example, the number of SCells supporting parameter updates may be reported separately from other SCells, such as if the BFR message (e.g., enhanced BFR message) may be used for both conventional BFR reporting and for beam prediction parameter updates. In a second example, UE 115-*b* may jointly report a number of SCells that may be operated with the conventional candidate beam reporting (e.g., conventional BFR reporting) and a number of SCells supporting beam prediction parameter updates. In such cases, base station 105-*c* may determine how to allocate different reporting modes among the SCells.

In some cases, UE 115-*c* may report a number (e.g., maximum number) of parameters that may be updated by UE 115-*c*. In some cases, a number of parameters that may be updated by the UE 115-*c* may be specific to a certain type of parameter, such as a reporting parameter (e.g., CSI report) or a resource parameter (e.g., CSI-RS and/or SSB resource). For example, UE 115-*c* may indicate that UE 115-*c* supports monitoring and/or updating two CSI reports and two resources (e.g., CSI-RS and/or SSB resources) for a respective SCell (e.g., via one or more beam prediction parameter update fields as described herein).

At 710, in some cases, base station 105-*c* may transmit, to UE 115-*c*, a reporting configuration for requesting beam management parameter updates via a BFR message. For example, as described with reference to FIGS. 4A-6B, base station 105-*c* may indicate one or more SCells associated with parameter update requests (e.g., and one or more other SCells not associated with parameter update requests), may indicate one or more characteristics of a bitmap of the BFR message, may indicate one or more characteristics of parameter update fields of the BFR message, or any other information that may be used by UE 115-*c* in requesting the parameter update(s). In some cases, the reporting configuration may be indicated by one or more transmissions from base station 105-*c*.

At 715, in some cases, base station 105-*c* may transmit, to UE 115-*c*, a scheduling request configuration for requesting beam management parameter updates via a BFR message. For example, as described with reference to FIG. 3, base station 105-*c* may configure one or more scheduling requests and/or scheduling request resources associated with an enhanced BFR message, a conventional BFR message, or both. Base station 105-*c* may also configure one or more parameters or fields associated with the scheduling request (s). In some cases, the scheduling request configuration may be indicated by one or more transmissions from base station 105-*c*. In some cases, base station 105-*c* may indicate the reporting configuration and the scheduling configuration together.

At 720, UE 115-*c* may identify a probability of a change in a ranking of beams for wireless communications by the UE. For example, UE 115-*c* may identify a probability that a top beam, or another beam, may change within a future time period. In some cases, UE 115-*c* may identify the probability of the change using a machine learning model.

At 725, in some cases, UE 115-*c* may transmit a scheduling request to base station 105-*c*, where the scheduling request may request resources (e.g., PUCCH resources) for transmission of a BFR message (e.g., an enhanced BFR message). For example, UE 115-*c* may transmit the scheduling request in accordance with the scheduling request configuration indicated by base station 105-*c* at 715.

At 730, UE 115-*c* may transmit, to base station 105-*c* and based on identifying the probability of the change in the ranking of the beams, a MAC-CE that includes a BFR message. The BFR message may include a request to adjust a parameter associated with a beam management procedure for one or more first SCells (e.g., associated with a PCell supported by base station 105-*c*). The one or more first SCells may be different from one or more second SCells associated with using BFR messages to transmit BFR reports. For example, UE 115-*c* may transmit the BFR message according to the reporting configuration indicated by base station 105-*c* at 710 (e.g., as described with reference to FIGS. 4A-6B). The parameter may include a reporting periodicity, a resource periodicity, a number of resources, or any combination thereof, among other examples.

At 735, UE 115-*c* and base station 105-*c* may perform the beam management procedure based on the request to adjust the parameter associated with the beam management procedure. For example, UE 115-*c* and base station 105-*c* may perform the beam management procedure based on one or more updated parameters.

Figure 8:
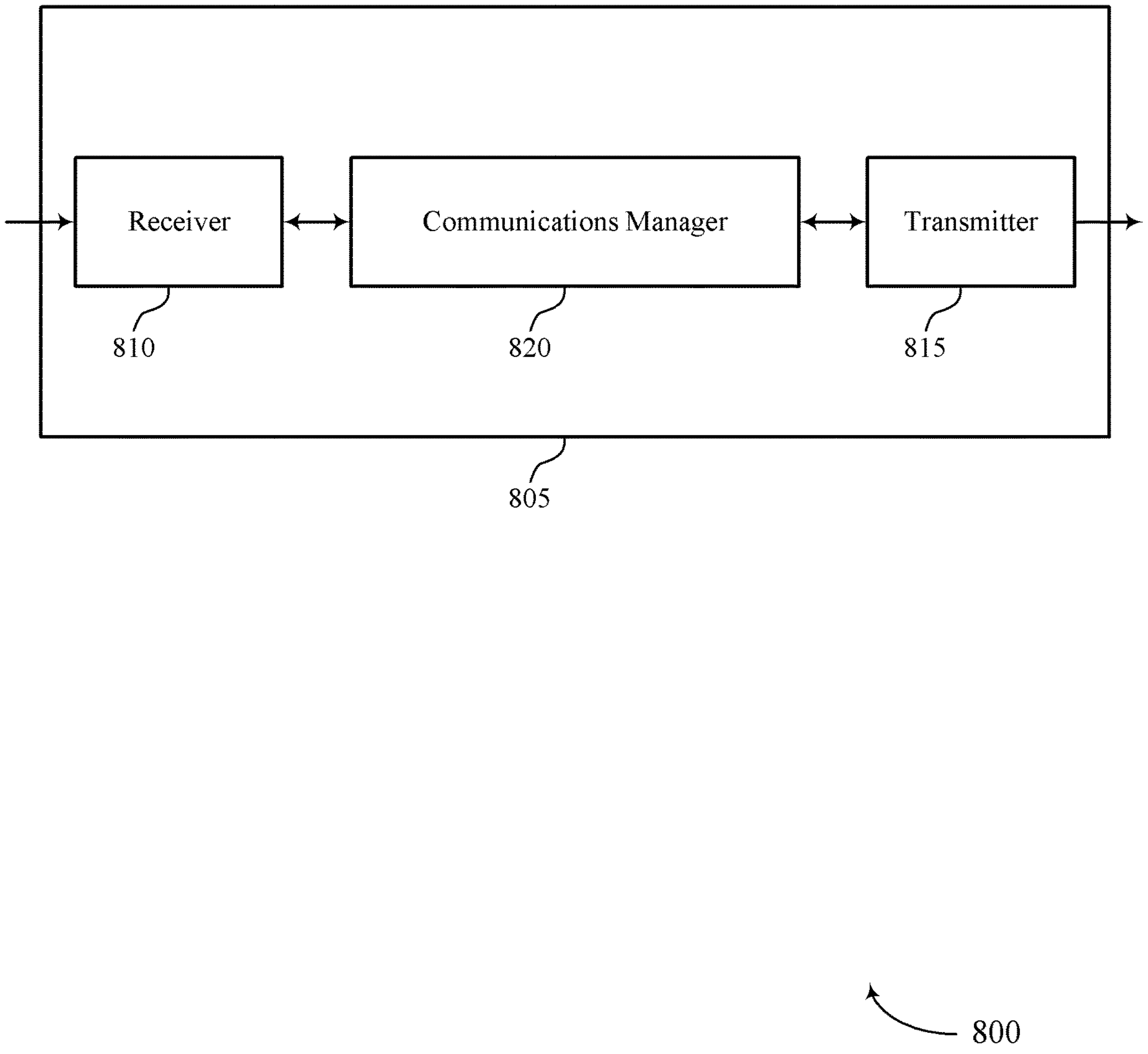
FIGS. 8 and 9 show block diagrams of devices that support enhanced beam management based on beam prediction in accordance with aspects of the present disclosure.

FIG. 8 shows a block diagram 800 of a device 805 that supports enhanced beam management based on beam prediction in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to enhanced beam management based on beam prediction). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to enhanced beam management based on beam prediction). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of enhanced beam management based on beam prediction as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for identifying a probability of a change in a ranking of beams for wireless communications by the UE. The communications manager 820 may be configured as or otherwise support a means for transmitting, to a base station based on identifying the probability of the change in the ranking of the beams, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE. The communications manager 820 may be configured as or otherwise support a means for performing the beam management procedure with the base station based on the request to adjust the parameter associated with the beam management procedure.

The actions performed by the communications manager 820, among other examples herein, may be implemented to realize one or more potential advantages. For example, communications manager 820 may increase available battery power and communication quality at a wireless device (e.g., a UE 115) by supporting adaptation of beam management procedures, which may increase communication quality at the wireless device by supporting dynamic changes to beam management procedures. The increase in communication quality may result in increased link performance and decreased overhead based on the different RS periodicities. Accordingly, communications manager 820 may save power and increase battery life at a wireless device (e.g., a UE 115) by strategically increasing a quality of communications at a wireless device (e.g., a UE 115).

Figure 9:
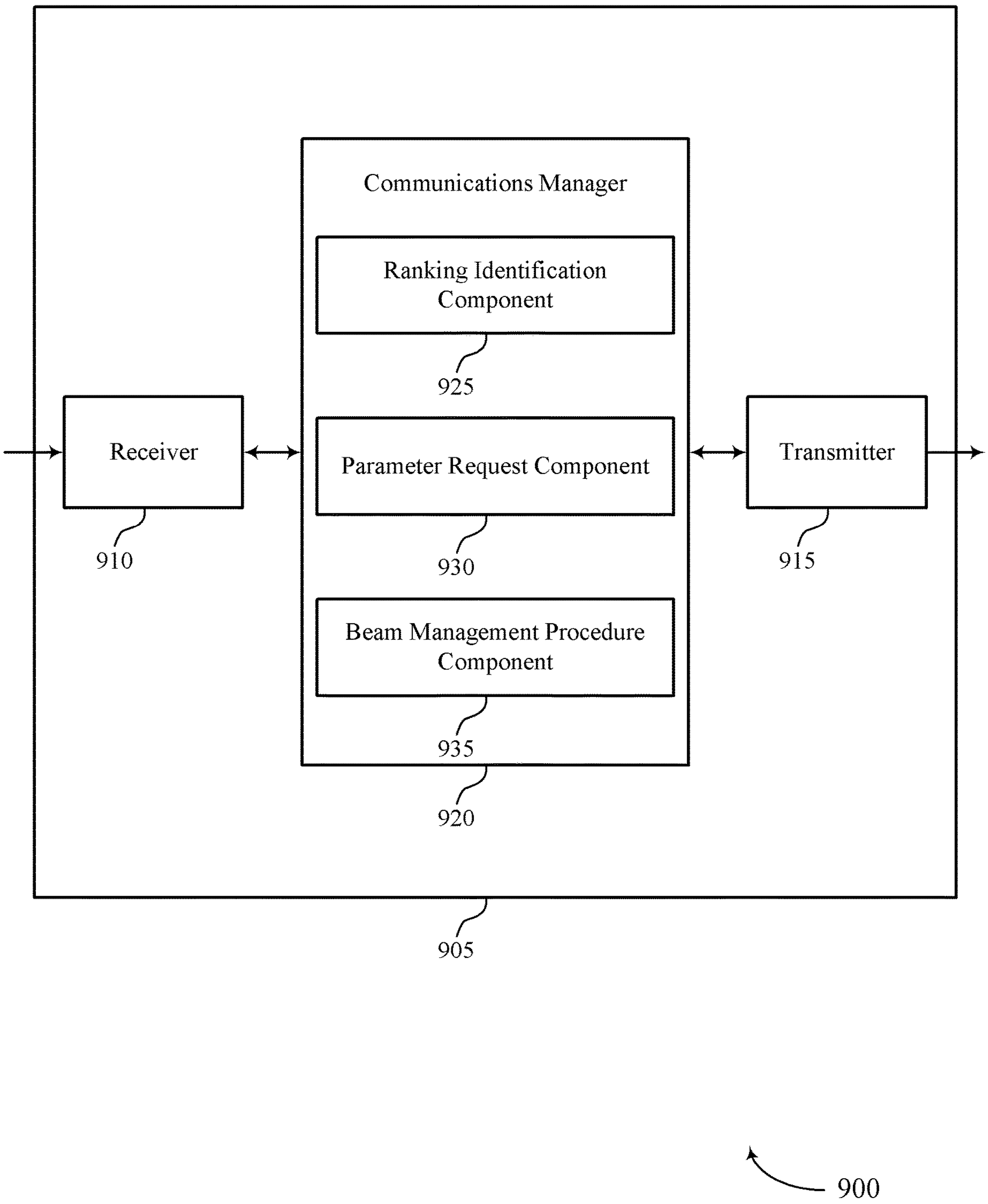

FIG. 9 shows a block diagram 900 of a device 905 that supports enhanced beam management based on beam prediction in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to enhanced beam management based on beam prediction). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to enhanced beam management based on beam prediction). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of enhanced beam management based on beam prediction as described herein. For example, the communications manager 920 may include a ranking identification component 925, a parameter request component 930, a beam management procedure component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The ranking identification component 925 may be configured as or otherwise support a means for identify a probability of a change in a ranking of beams for wireless communications by the UE. The parameter request component 930 may be configured as or otherwise support a means for transmitting, to a base station based on identifying the probability of the change in the ranking of the beams, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE. The beam management procedure component 935 may be configured as or otherwise support a means for performing the beam management procedure with the base station based on the request to adjust the parameter associated with the beam management procedure.

A processor of a wireless device (e.g., controlling the receiver 910, the transmitter 915, or the transceiver 1115 as described with reference to FIG. 11) may increase available battery power and communication quality. The increased communication quality may increase available battery power and throughput (e.g., via implementation of system components described with reference to FIG. 10) compared to other systems and techniques, for example, that do not support adaptation to beam management procedures. Further, the processor of the wireless device may identify one or more aspects of a request to update a parameter for a beam management procedure, which may result in increased communication quality, as well as save power and increase battery life at the wireless device (e.g., by strategically supporting adjustment to one or more beam management parameters), among other benefits.

Figure 10:
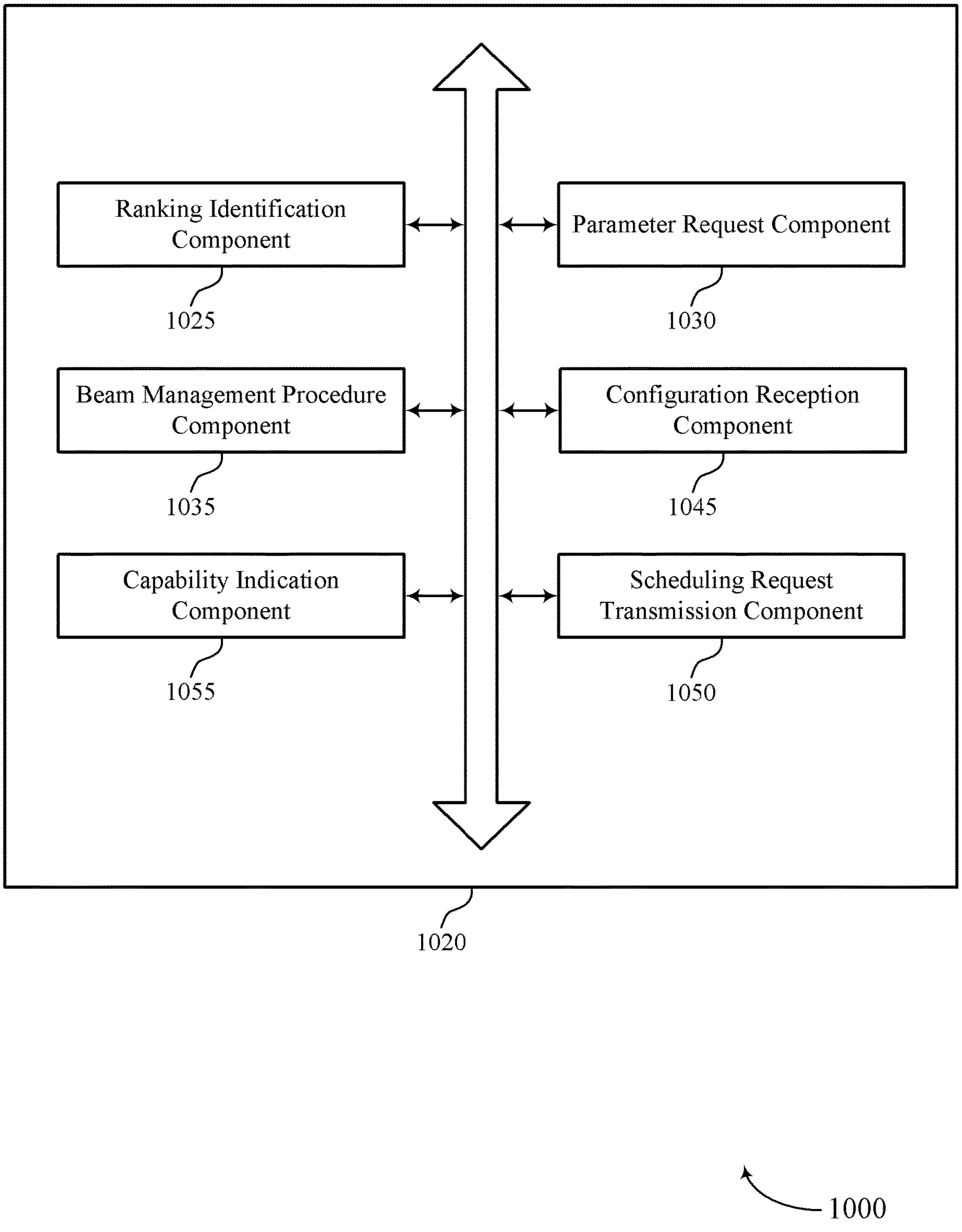
FIG. 10 shows a block diagram of a communications manager that supports enhanced beam management based on beam prediction in accordance with aspects of the present disclosure.

FIG. 10 shows a block diagram 1000 of a communications manager 1020 that supports enhanced beam management based on beam prediction in accordance with aspects of the present disclosure. The communications manager 1020 may be an example of aspects of a communications manager 820, a communications manager 920, or both, as described herein. The communications manager 1020, or various components thereof, may be an example of means for performing various aspects of enhanced beam management based on beam prediction as described herein. For example, the communications manager 1020 may include a ranking identification component 1025, a parameter request component 1030, a beam management procedure component 1035, a configuration reception component 1045, a scheduling request transmission component 1050, a capability indication component 1055, or any combination thereof. Each of these components may communicate, directly or indirectly, with one another (e.g., via one or more buses).

The communications manager 1020 may support wireless communication at a UE in accordance with examples as disclosed herein. The ranking identification component 1025 may be configured as or otherwise support a means for identify a probability of a change in a ranking of beams for wireless communications by the UE. The parameter request component 1030 may be configured as or otherwise support a means for transmitting, to a base station based on identifying the probability of the change in the ranking of the beams, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE. The beam management procedure component 1035 may be configured as or otherwise support a means for performing the beam management procedure with the base station based on the request to adjust the parameter associated with the beam management procedure.

In some examples, the parameter may include a periodicity of reporting a measurement associated with the beam management procedure, a periodicity of a reference signal resource associated with the beam management procedure, or a number of reference signal resources associated with the beam management procedure. In some examples, the configuration reception component 1045 may be configured as or otherwise support a means for receiving signaling from the base station indicating that the UE is to use BFR messages to request adjustments to the parameter, where transmitting the BFR message including the request to adjust the parameter is based on receiving the signaling indicating that the UE is to use BFR messages to request adjustments to the parameter.

In some examples, the configuration reception component 1045 may be configured as or otherwise support a means for receiving signaling from the base station indicating a configuration for a type of scheduling request corresponding to BFR messages including requests to adjust the parameter, the type of scheduling request including a type of PUCCH message. In some examples, the scheduling request transmission component 1050 may be configured as or otherwise support a means for transmitting a PUCCH message including a scheduling request according to the configuration for the type of scheduling request, the scheduling request including a request for resources for transmission of the BFR message.

In some examples, the one or more first SCells belong to a first subset of SCells of a set of multiple SCells. In some examples, the first subset of SCells is associated with using BFR messages to request adjustments to the parameter. In some examples, a second subset of SCells of the set of multiple SCells is associated with using BFR messages to transmit BFR reports, the second subset of SCells including the one or more second SCells.

In some examples, the configuration reception component 1045 may be configured as or otherwise support a means for receiving signaling from the base station indicating that the one or more first SCells belong to the first subset of SCells associated with using BFR messages to request adjustments to the parameter. In some examples, the parameter request component 1030 may be configured as or otherwise support a means for selecting, at the UE, the first subset of SCells, where the BFR message includes an indication that the one or more first SCells belong to the first subset of SCells associated with using BFR messages to request adjustments to the parameter.

In some examples, the BFR message includes an indication of the one or more first SCells in a bitmap associated with the set of multiple SCells or in a bitmap associated with the first subset of SCells. In some examples, for an SCell of the one or more first SCells, the request to adjust the parameter is indicated via a single bit associated with the SCell within the BFR message. In some examples, an amount of adjustment to the parameter associated with the single bit is configured prior to transmission of the BFR message. In some examples, for an SCell of the one or more first SCells, the request to adjust the parameter is indicated via multiple bits associated with the SCell within the BFR message, the multiple bits indicating an updated value for the parameter or an amount of adjustment to the parameter.

In some examples, the configuration reception component 1045 may be configured as or otherwise support a means for receiving signaling from the base station indicating a first scheduling request resource corresponding to BFR messages requesting to adjust the parameter, the first scheduling request resource including a first PUCCH resource. In some examples, the scheduling request transmission component 1050 may be configured as or otherwise support a means for transmitting, via the first scheduling request resource, a PUCCH message including a scheduling request, the scheduling request including a request for resources for transmission of the BFR message.

In some examples, the configuration reception component 1045 may be configured as or otherwise support a means for receiving signaling from the base station indicating a second scheduling request resource corresponding to BFR messages including BFR reports, the second scheduling request resource including a second PUCCH resource. In some examples, the scheduling request includes an indication of whether the scheduling request is associated with the BFR message, a second BFR message including a BFR report, or both.

In some examples, to support transmitting the BFR message, the parameter request component 1030 may be configured as or otherwise support a means for transmitting the BFR message to a PCell, an SCell, or both.

In some examples, the capability indication component 1055 may be configured as or otherwise support a means for transmitting, to the base station, an indication of a quantity of SCells for which the UE supports using BFR messages to request adjustments to the parameter. In some examples, the capability indication component 1055 may be configured as or otherwise support a means for transmitting an indication of a quantity of parameters for which the UE supports using BFR messages to request adjustments. For example, the UE may report a quantity (e.g., maximum number, maximum quantity) of parameters that may be updated by the UE. In some cases, a quantity of parameters that may be updated by the UE may be specific to a certain type of parameter, such as a reporting parameter type (e.g., CSI report) or a resource parameter type (e.g., CSI-RS and/or SSB resource). For example, the UE may indicate that the UE supports monitoring and/or updating up to two CSI reports, up to two resources (e.g., CSI-RS and/or SSB resources), or both, for a respective SCell (e.g., via one or more beam prediction parameter update fields as described herein).

In some examples, to support identifying the probability of the change in the ranking of the beams, the ranking identification component 1025 may be configured as or otherwise support a means for using one or more machine learning models to determine the probability of the change in the ranking of the beams.

Figure 11:
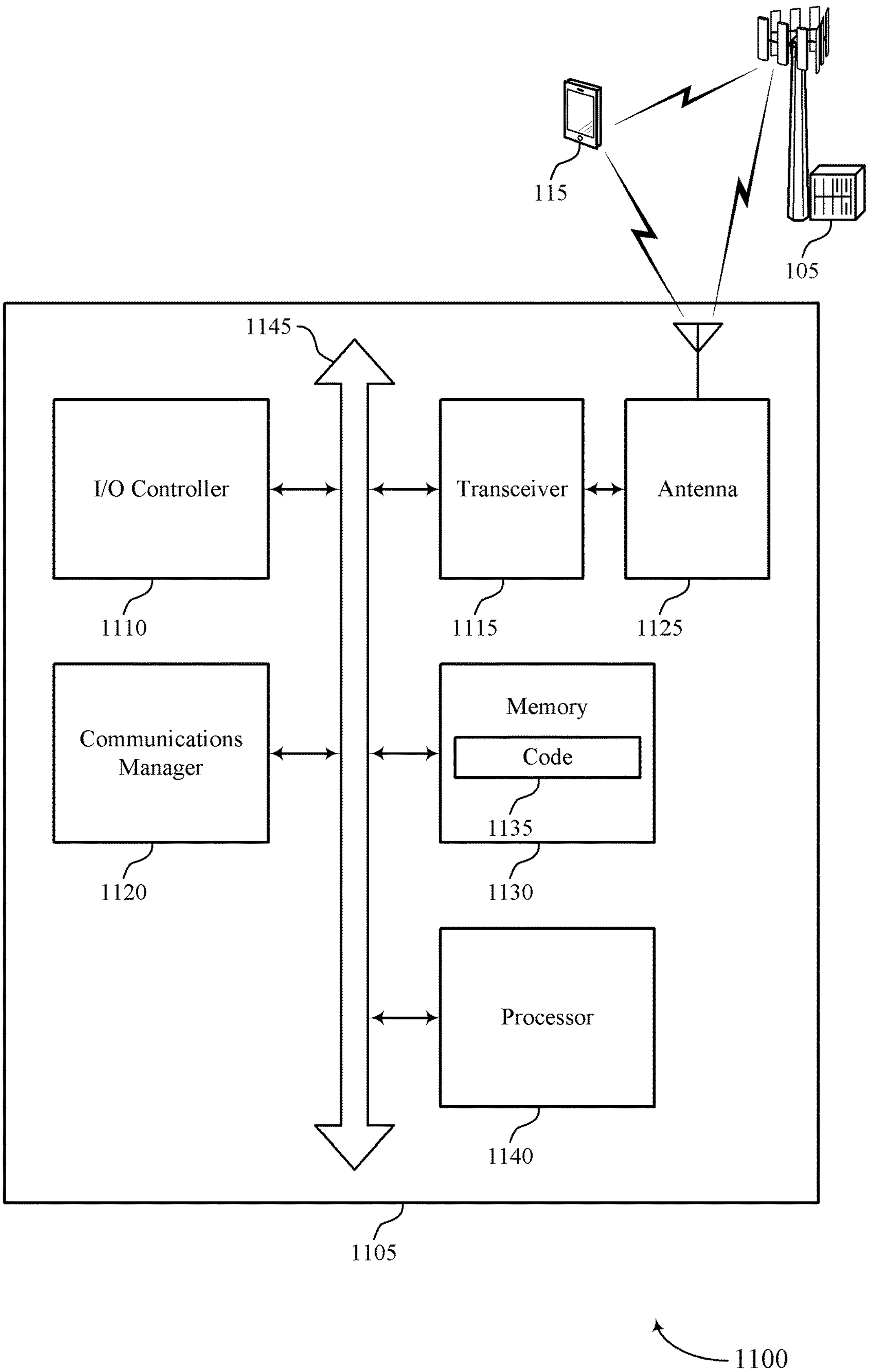
FIG. 11 shows a diagram of a system including a device that supports enhanced beam management based on beam prediction in accordance with aspects of the present disclosure.

FIG. 11 shows a diagram of a system 1100 including a device 1105 that supports enhanced beam management based on beam prediction in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting enhanced beam management based on beam prediction). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for identifying a probability of a change in a ranking of beams for wireless communications by the UE. The communications manager 1120 may be configured as or otherwise support a means for transmitting, to a base station based on identifying the probability of the change in the ranking of the beams, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE. The communications manager 1120 may be configured as or otherwise support a means for performing the beam management procedure with the base station based on the request to adjust the parameter associated with the beam management procedure.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signaling as described herein via the transceiver 1115. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of enhanced beam management based on beam prediction as described herein, or the processor 1140 and the memory 1130 may be otherwise configured to perform or support such operations.

Figure 12:
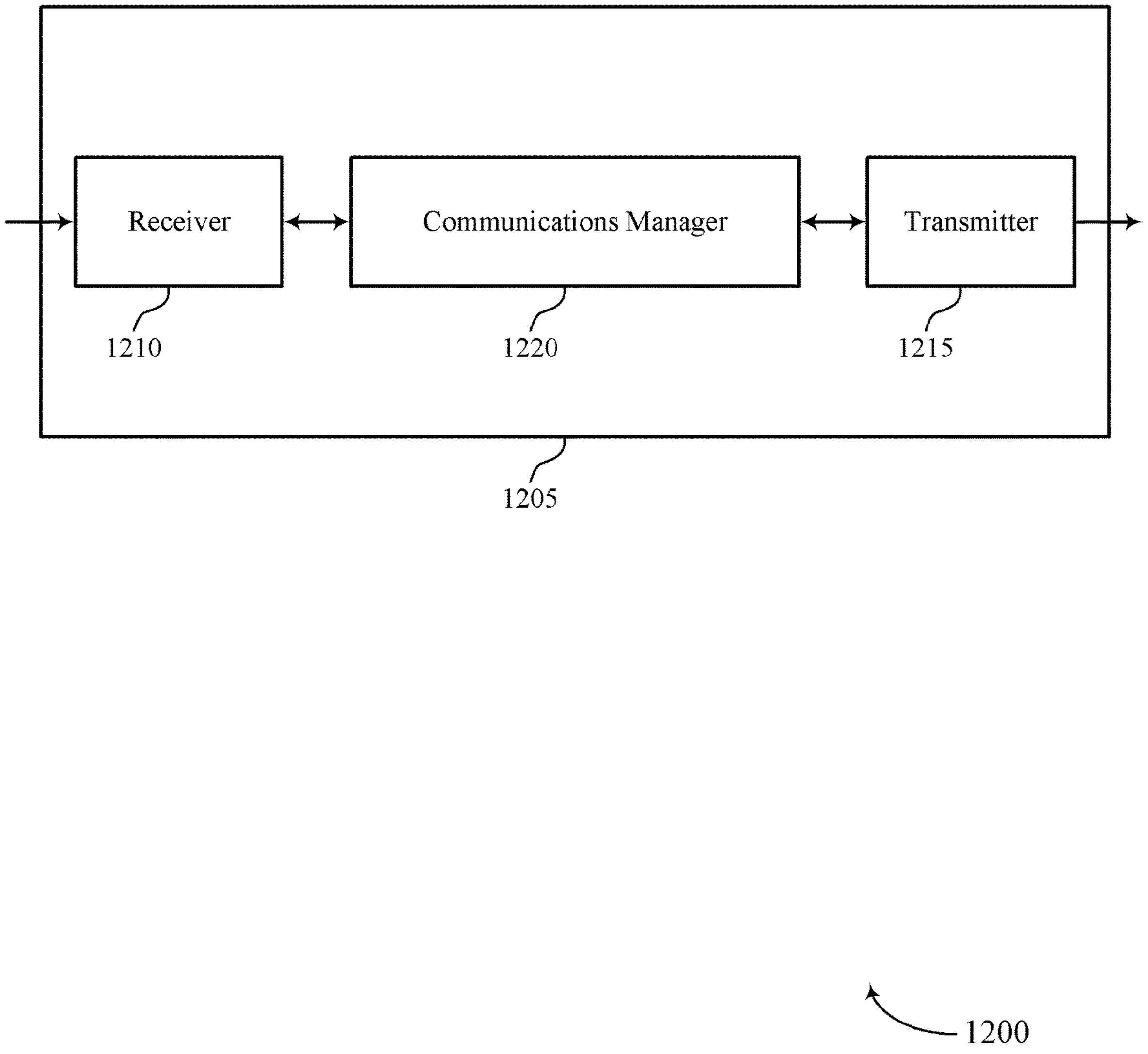
FIGS. 12 and 13 show block diagrams of devices that support enhanced beam management based on beam prediction in accordance with aspects of the present disclosure.

FIG. 12 shows a block diagram 1200 of a device 1205 that supports enhanced beam management based on beam prediction in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to enhanced beam management based on beam prediction). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to enhanced beam management based on beam prediction). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of enhanced beam management based on beam prediction as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for receiving, from a UE, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and where the request to adjust the parameter is based on a probability of a change in a ranking of beams for wireless communications by the UE. The communications manager 1220 may be configured as or otherwise support a means for performing the beam management procedure with the UE based on the request to adjust the parameter associated with the beam management procedure.

Figure 13:
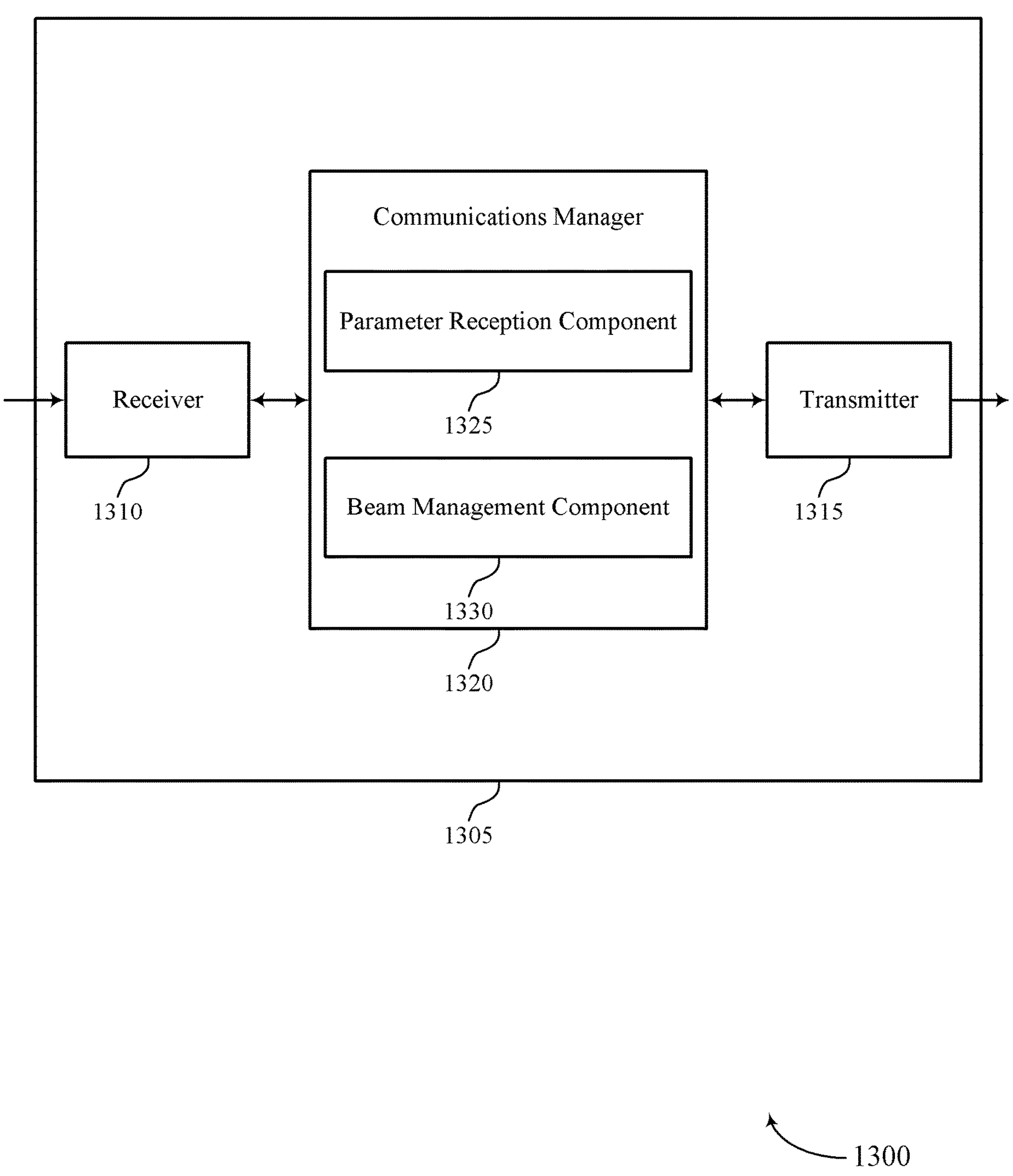

FIG. 13 shows a block diagram 1300 of a device 1305 that supports enhanced beam management based on beam prediction in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to enhanced beam management based on beam prediction). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to enhanced beam management based on beam prediction). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of enhanced beam management based on beam prediction as described herein. For example, the communications manager 1320 may include a parameter reception component 1325 a beam management component 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The parameter reception component 1325 may be configured as or otherwise support a means for receiving, from a UE, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and where the request to adjust the parameter is based on a probability of a change in a ranking of beams for wireless communications by the UE. The beam management component 1330 may be configured as or otherwise support a means for performing the beam management procedure with the UE based on the request to adjust the parameter associated with the beam management procedure.

Figure 14:
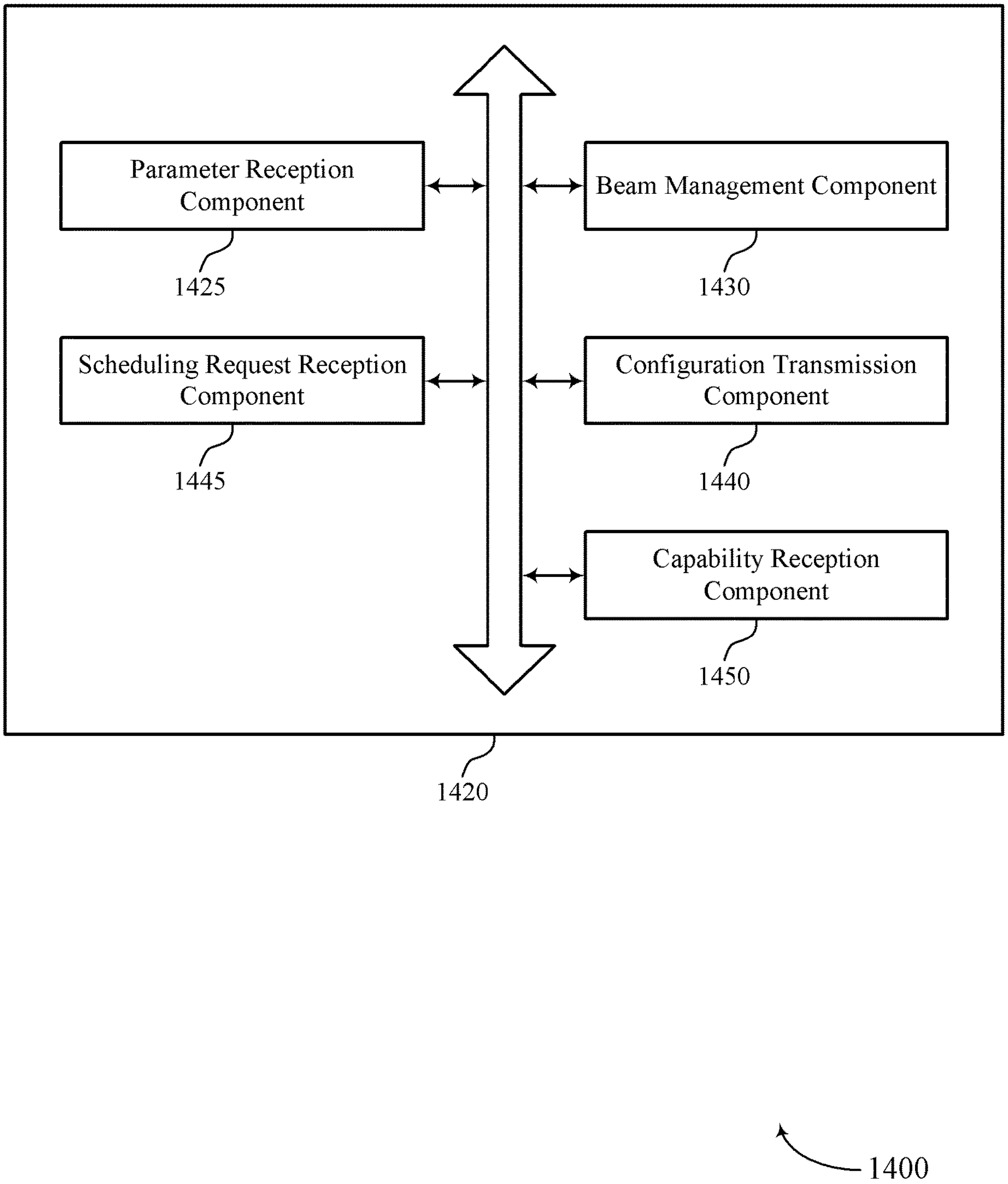
FIG. 14 shows a block diagram of a communications manager that supports enhanced beam management based on beam prediction in accordance with aspects of the present disclosure.

FIG. 14 shows a block diagram 1400 of a communications manager 1420 that supports enhanced beam management based on beam prediction in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of enhanced beam management based on beam prediction as described herein. For example, the communications manager 1420 may include a parameter reception component 1425, a beam management component 1430, a configuration transmission component 1440, a scheduling request reception component 1445, a capability reception component 1450, or any combination thereof. Each of these components may communicate, directly or indirectly, with one another (e.g., via one or more buses).

The communications manager 1420 may support wireless communication at a base station in accordance with examples as disclosed herein. The parameter reception component 1425 may be configured as or otherwise support a means for receiving, from a UE, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and where the request to adjust the parameter is based on a probability of a change in a ranking of beams for wireless communications by the UE. The beam management component 1430 may be configured as or otherwise support a means for performing the beam management procedure with the UE based on the request to adjust the parameter associated with the beam management procedure.

In some examples, the parameter may include a periodicity of reporting a measurement associated with the beam management procedure, a periodicity of a reference signal resource associated with the beam management procedure, or a number of reference signal resources associated with the beam management procedure. In some examples, the configuration transmission component 1440 may be configured as or otherwise support a means for transmitting signaling indicating that the UE is to use BFR messages to request adjustments to the parameter, where receiving the BFR message including the request to adjust the parameter is based on transmitting the signaling indicating that the UE is to use BFR messages to request adjustments to the parameter.

In some examples, the configuration transmission component 1440 may be configured as or otherwise support a means for transmitting signaling to the UE indicating a configuration for a type of scheduling request corresponding to BFR messages including the request to adjust the parameter, the type of scheduling request including a type of PUCCH message. In some examples, the scheduling request reception component 1445 may be configured as or otherwise support a means for receiving a PUCCH message including a scheduling request according to the configuration for the type of scheduling request, the scheduling request including a request for resources for transmission of the BFR message.

In some examples, the one or more first SCells belong to a first subset of SCells of a set of multiple SCells. In some examples, the first subset of second cells is associated with using BFR messages to request adjustments to the parameter. In some examples, a second subset of SCells of the set of multiple SCells is associated with using BFR messages to transmit BFR reports, the second subset of SCells including the one or more second SCells.

In some examples, the configuration transmission component 1440 may be configured as or otherwise support a means for transmitting signaling to the UE indicating that the one or more first SCells belong to the first subset of SCells associated with using BFR messages to request adjustments to the parameter. In some examples, the BFR message includes an indication that the one or more first SCells belong to the first subset of SCells associated with using BFR messages to request adjustments to the parameter.

In some examples, the BFR message includes an indication of the one or more first SCells in a bitmap associated with the set of multiple SCells or in a bitmap associated with the first subset of SCells. In some examples, for an SCell of the one or more first SCells, the request to adjust the parameter is indicated via a single bit associated with the SCell within the BFR message. In some examples, an amount of adjustment to the parameter associated with the single bit is configured prior to transmission of the BFR message. In some examples, for an SCell of the one or more first SCells, the request to adjust the parameter is indicated via multiple bits associated with the SCell within the BFR message, the multiple bits indicating an updated value for the parameter or an amount of adjustment to the parameter.

In some examples, the configuration transmission component 1440 may be configured as or otherwise support a means for transmitting signaling to the UE indicating a first scheduling request resource corresponding to BFR messages requesting to adjust the parameter, the first scheduling request resource including a first PUCCH resource. In some examples, the scheduling request reception component 1445 may be configured as or otherwise support a means for receiving, via the first scheduling request resource, a PUCCH message including a scheduling request, the scheduling request including a request for resources for transmission of the BFR message.

In some examples, the configuration transmission component 1440 may be configured as or otherwise support a means for transmitting signaling to the UE indicating a second scheduling request resource corresponding to BFR messages including BFR reports, the second scheduling request resource including a second PUCCH resource. In some examples, the scheduling request includes an indication of whether the scheduling request is associated with the BFR message, a second BFR message including a BFR report, or both.

In some examples, to support receiving the BFR message, the parameter reception component 1425 may be configured as or otherwise support a means for receiving the BFR message at a PCell, an SCell, or both.

In some examples, the capability reception component 1450 may be configured as or otherwise support a means for receiving, from the UE, an indication of a quantity of SCells for which the UE supports using BFR messages to request adjustments to the parameter. In some examples, the capability reception component 1450 may be configured as or otherwise support a means for receiving an indication of a quantity of parameters for which the UE supports using BFR messages to request adjustments.

Figure 15:
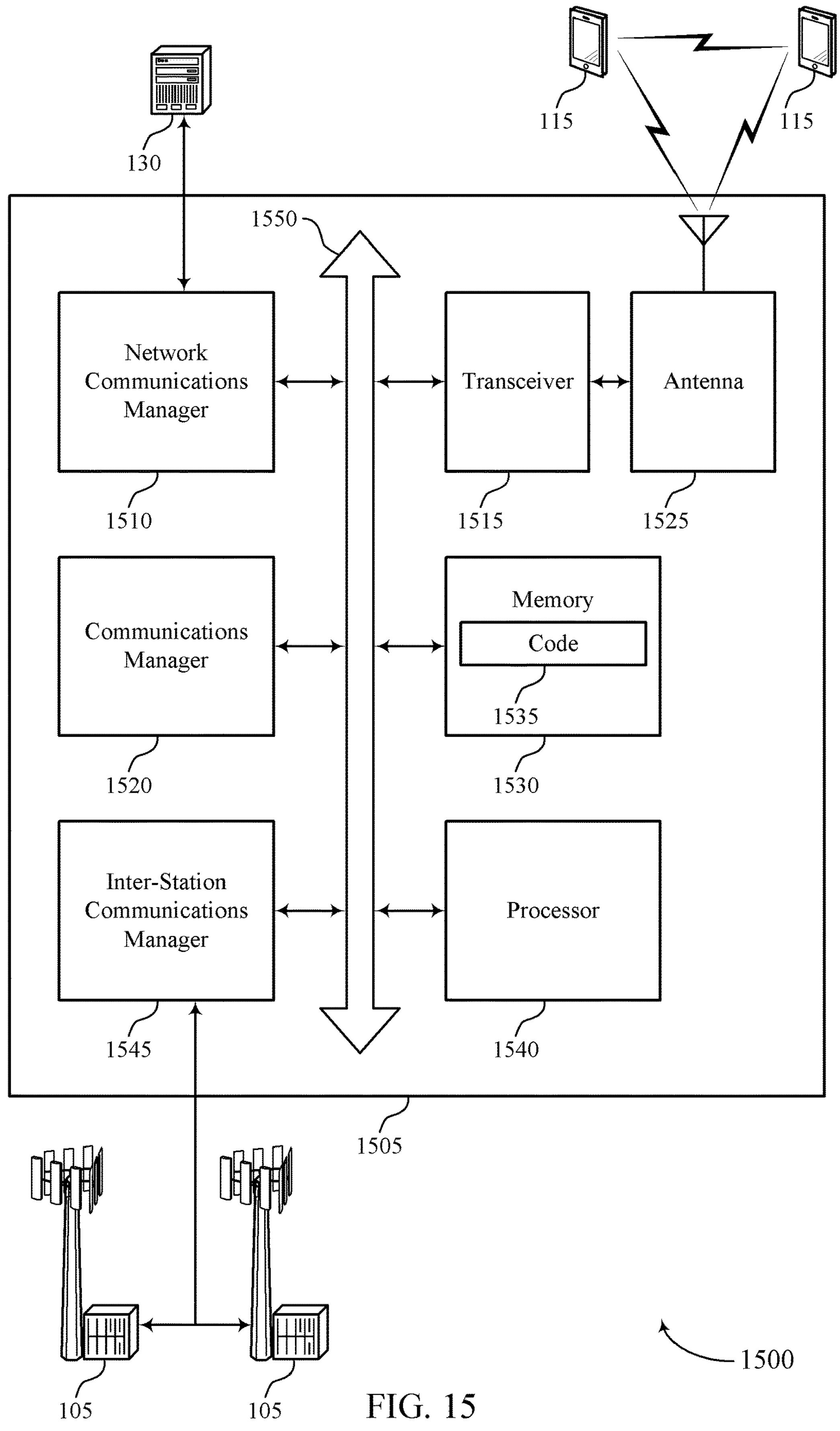
FIG. 15 shows a diagram of a system including a device that supports enhanced beam management based on beam prediction in accordance with aspects of the present disclosure.

FIG. 15 shows a diagram of a system 1500 including a device 1505 that supports enhanced beam management based on beam prediction in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting enhanced beam management based on beam prediction). For example, the device 1505 or a component of the device 1505 may include a processor 1540 and memory 1530 coupled with or to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for receiving, from a UE, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and where the request to adjust the parameter is based on a probability of a change in a ranking of beams for wireless communications by the UE. The communications manager 1520 may be configured as or otherwise support a means for performing the beam management procedure with the UE based on the request to adjust the parameter associated with the beam management procedure.

In some examples, the communications manager 1520 may be configured to perform various operations (e.g., receiving, monitoring, transmitting) using or otherwise in cooperation with the transceiver 1515, the one or more antennas 1525, or any combination thereof. For example, the communications manager 1520 may be configured to receive or transmit messages or other signaling as described herein via the transceiver 1515. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of enhanced beam management based on beam prediction as described herein, or the processor 1540 and the memory 1530 may be otherwise configured to perform or support such operations.

Figure 16:
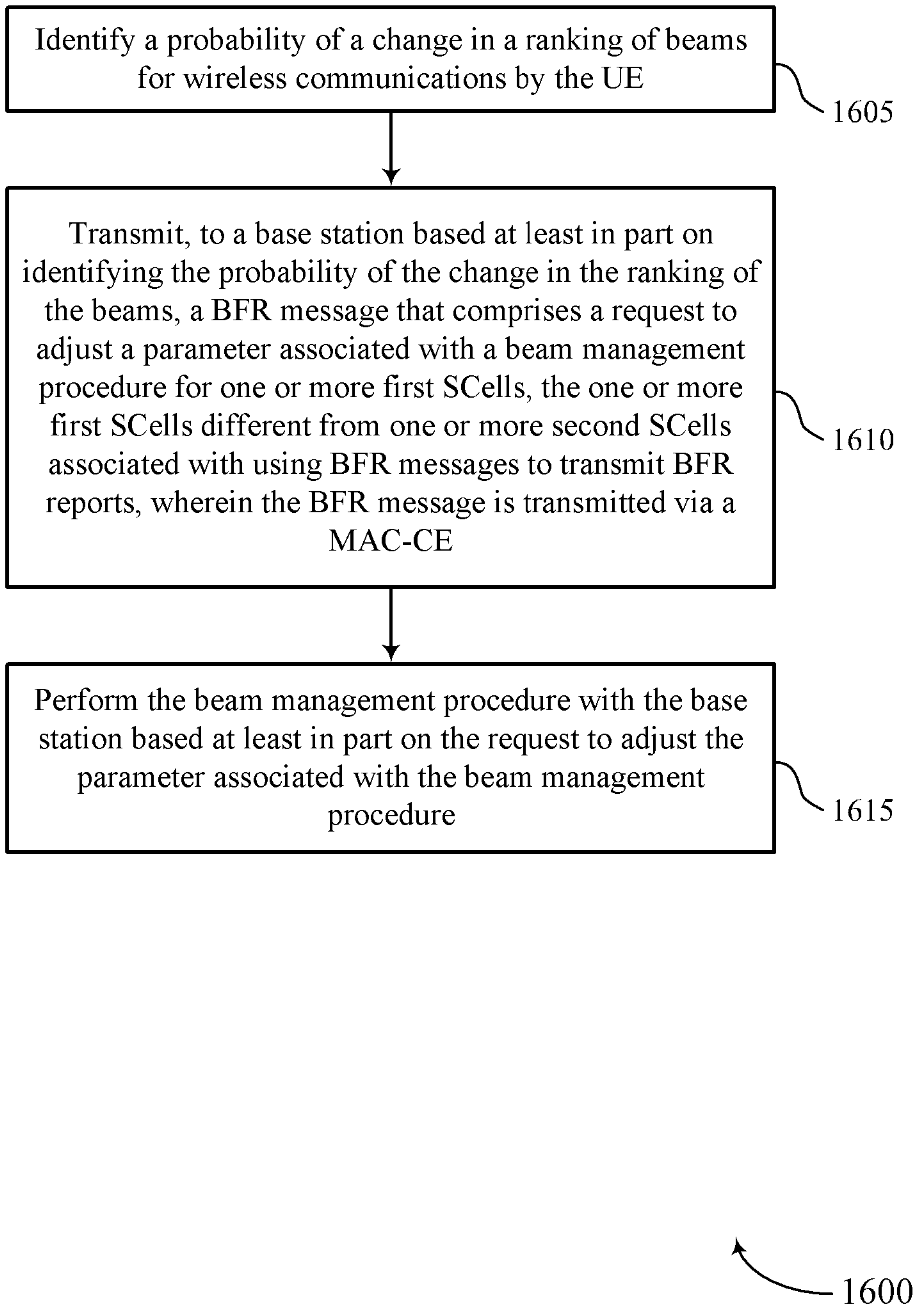
FIGS. 16 through 19 show flowcharts illustrating methods that support enhanced beam management based on beam prediction in accordance with aspects of the present disclosure.

FIG. 16 shows a flowchart illustrating a method 1600 that supports enhanced beam management based on beam prediction in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include identify a probability of a change in a ranking of beams for wireless communications by the UE. The operations of 1605 may be performed in accordance with examples as disclosed herein. In some examples, aspects of the operations of 1605 may be performed by a ranking identification component 1025 as described with reference to FIG. 10. Additionally or alternatively, means for performing 1605 may, but not necessarily, include, for example, antenna 1125, transceiver 1115, communications manager 1120, memory 1130 (including code 1135), processor 1140 and/or bus 1145.

At 1610, the method may include transmitting, to a base station based on identifying the probability of the change in the ranking of the beams, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE. The operations of 1610 may be performed in accordance with examples as disclosed herein. In some examples, aspects of the operations of 1610 may be performed by a parameter request component 1030 as described with reference to FIG. 10. Additionally or alternatively, means for performing 1610 may, but not necessarily, include, for example, antenna 1125, transceiver 1115, communications manager 1120, memory 1130 (including code 1135), processor 1140 and/or bus 1145.

At 1615, the method may include performing the beam management procedure with the base station based on the request to adjust the parameter associated with the beam management procedure. The operations of 1615 may be performed in accordance with examples as disclosed herein. In some examples, aspects of the operations of 1615 may be performed by a beam management procedure component 1035 as described with reference to FIG. 10. Additionally or alternatively, means for performing 1615 may, but not necessarily, include, for example, antenna 1125, transceiver 1115, communications manager 1120, memory 1130 (including code 1135), processor 1140 and/or bus 1145.

Figure 17:
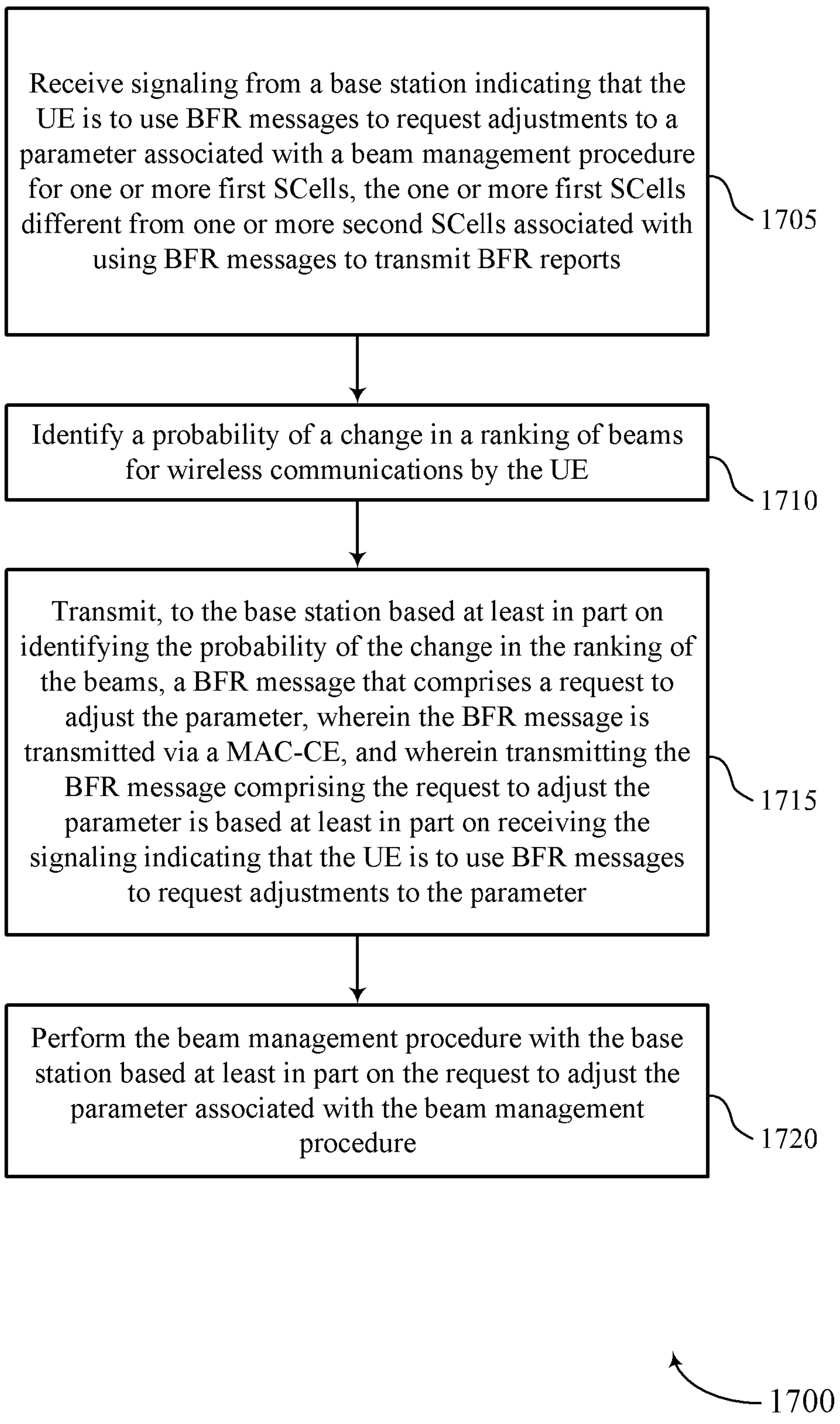

FIG. 17 shows a flowchart illustrating a method 1700 that supports enhanced beam management based on beam prediction in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving signaling from a base station indicating that the UE is to use BFR messages to request adjustments to a parameter associated with a beam management procedure for one or more first SCells, the one or more first SCells different from one or more second SCells associated with using BFR messages to transmit BFR reports, where the BFR message is transmitted via a MAC-CE. The operations of 1705 may be performed in accordance with examples as disclosed herein. In some examples, aspects of the operations of 1705 may be performed by a configuration reception component 1045 as described with reference to FIG. 10. Additionally or alternatively, means for performing 1705 may, but not necessarily, include, for example, antenna 1125, transceiver 1115, communications manager 1120, memory 1130 (including code 1135), processor 1140 and/or bus 1145.

At 1710, the method may include identify a probability of a change in a ranking of beams for wireless communications by the UE. The operations of 1710 may be performed in accordance with examples as disclosed herein. In some examples, aspects of the operations of 1710 may be performed by a ranking identification component 1025 as described with reference to FIG. 10. Additionally or alternatively, means for performing 1710 may, but not necessarily, include, for example, antenna 1125, transceiver 1115, communications manager 1120, memory 1130 (including code 1135), processor 1140 and/or bus 1145.

At 1715, the method may include transmitting, to the base station based on identifying the probability of the change in the ranking of the beams, a BFR message that includes a request to adjust the parameter, where transmitting the BFR message including the request to adjust the parameter is based on receiving the signaling indicating that the UE is to use BFR messages to request adjustments to the parameter. The operations of 1715 may be performed in accordance with examples as disclosed herein. In some examples, aspects of the operations of 1715 may be performed by a parameter request component 1030 as described with reference to FIG. 10. Additionally or alternatively, means for performing 1715 may, but not necessarily, include, for example, antenna 1125, transceiver 1115, communications manager 1120, memory 1130 (including code 1135), processor 1140 and/or bus 1145.

At 1720, the method may include performing the beam management procedure with the base station based on the request to adjust the parameter associated with the beam management procedure. The operations of 1720 may be performed in accordance with examples as disclosed herein. In some examples, aspects of the operations of 1720 may be performed by a beam management procedure component 1035 as described with reference to FIG. 10. Additionally or alternatively, means for performing 1720 may, but not necessarily, include, for example, antenna 1125, transceiver 1115, communications manager 1120, memory 1130 (including code 1135), processor 1140 and/or bus 1145.

Figure 18:
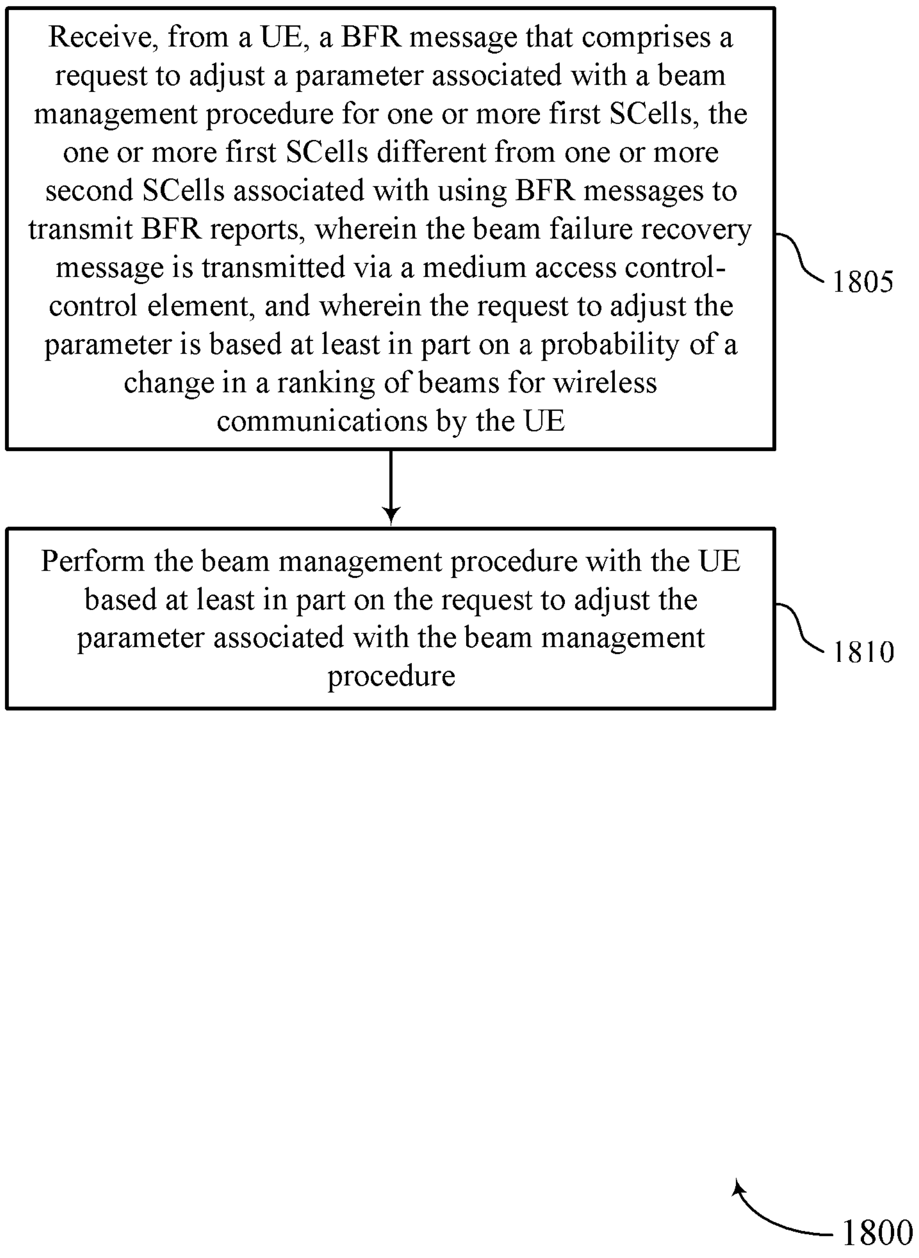

FIG. 18 shows a flowchart illustrating a method 1800 that supports enhanced beam management based on beam prediction in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, a BFR message that includes a request to adjust a parameter associated with a beam management procedure for one or more first SCells, the one or more first SCells different from one or more second SCells associated with using BFR messages to transmit BFR reports, where the BFR message is transmitted via a MAC-CE, and where the request to adjust the parameter is based on a probability of a change in a ranking of beams for wireless communications by the UE. The operations of 1805 may be performed in accordance with examples as disclosed herein. In some examples, aspects of the operations of 1805 may be performed by a parameter reception component 1425 as described with reference to FIG. 14. Additionally or alternatively, means for performing 1805 may, but not necessarily, include, for example, antenna 1525, transceiver 1515, communications manager 1520, memory 1530 (including code 1535), processor 1540 and/or bus 1550.

At 1810, the method may include performing the beam management procedure with the UE based on the request to adjust the parameter associated with the beam management procedure. The operations of 1810 may be performed in accordance with examples as disclosed herein. In some examples, aspects of the operations of 1810 may be performed by a beam management component 1430 as described with reference to FIG. 14. Additionally or alternatively, means for performing 1810 may, but not necessarily, include, for example, antenna 1525, transceiver 1515, communications manager 1520, memory 1530 (including code 1535), processor 1540 and/or bus 1550.

Figure 19:
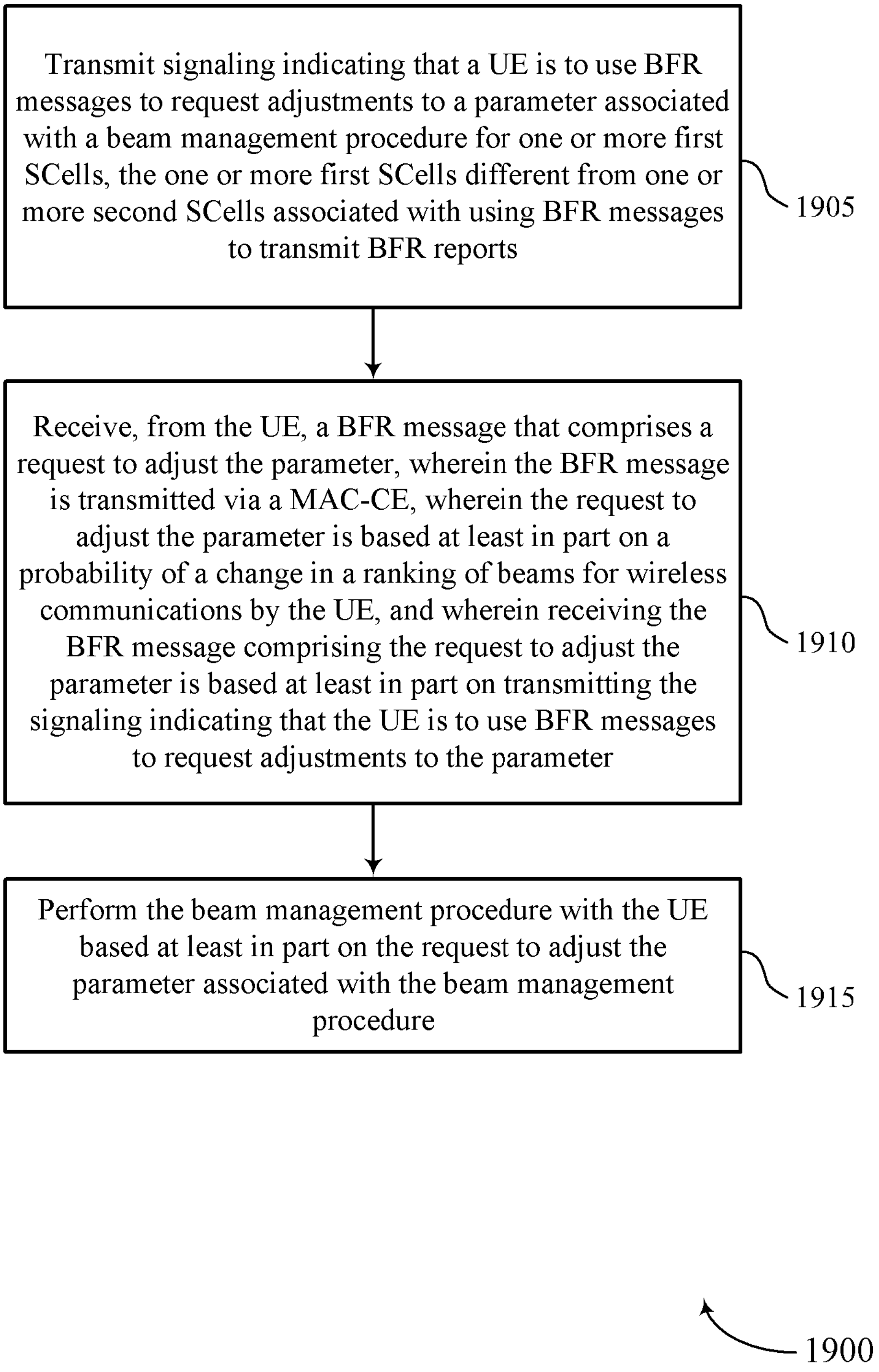

FIG. 19 shows a flowchart illustrating a method 1900 that supports enhanced beam management based on beam prediction in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting signaling indicating that a UE is to use BFR messages to request adjustments to a parameter associated with a beam management procedure for one or more first SCells, the one or more first SCells different from one or more second SCells associated with using BFR messages to transmit BFR reports. The operations of 1905 may be performed in accordance with examples as disclosed herein. In some examples, aspects of the operations of 1905 may be performed by a configuration transmission component 1440 as described with reference to FIG. 14. Additionally or alternatively, means for performing 1905 may, but not necessarily, include, for example, antenna 1525, transceiver 1515, communications manager 1520, memory 1530 (including code 1535), processor 1540 and/or bus 1550.

At 1910, the method may include receiving, from the UE, a BFR message that includes a request to adjust the parameter, where the BFR message is transmitted via a MAC-CE, where the request to adjust the parameter is based on a probability of a change in a ranking of beams for wireless communications by the UE, and where receiving the BFR message including the request to adjust the parameter is based on transmitting the signaling indicating that the UE is to use BFR messages to request adjustments to the parameter. The operations of 1910 may be performed in accordance with examples as disclosed herein. In some examples, aspects of the operations of 1910 may be performed by a parameter reception component 1425 as described with reference to FIG. 14. Additionally or alternatively, means for performing 1910 may, but not necessarily, include, for example, antenna 1525, transceiver 1515, communications manager 1520, memory 1530 (including code 1535), processor 1540 and/or bus 1550.

At 1915, the method may include performing the beam management procedure with the UE based on the request to adjust the parameter associated with the beam management procedure. The operations of 1915 may be performed in accordance with examples as disclosed herein. In some examples, aspects of the operations of 1915 may be performed by a beam management component 1430 as described with reference to FIG. 14. Additionally or alternatively, means for performing 1915 may, but not necessarily, include, for example, antenna 1525, transceiver 1515, communications manager 1520, memory 1530 (including code 1535), processor 1540 and/or bus 1550.

The following provides an overview of aspects of the present disclosure:

Aspect 1: A method for wireless communication at a UE, comprising: identify a probability of a change in a ranking of beams for wireless communications by the UE; transmitting, to a base station based at least in part on identifying the probability of the change in the ranking of the beams, a BFR message that comprises a request to adjust a parameter associated with a beam management procedure for one or more first SCells, the one or more first SCells different from one or more second SCells associated with using BFR messages to transmit BFR reports, wherein the BFR message is transmitted via a MAC-CE; and performing the beam management procedure with the base station based at least in part on the request to adjust the parameter associated with the beam management procedure.

Aspect 2: The method of aspect 1, wherein the parameter comprises: a periodicity of reporting a measurement associated with the beam management procedure; a periodicity of a reference signal resource associated with the beam management procedure; or a number of reference signal resources associated with the beam management procedure.

Aspect 3: The method of any of aspects 1 through 2, further comprising: receiving signaling from the base station indicating that the UE is to use BFR messages to request adjustments to the parameter, wherein transmitting the BFR message comprising the request to adjust the parameter is based at least in part on receiving the signaling indicating that the UE is to use BFR messages to request adjustments to the parameter.

Aspect 4: The method of any of aspects 1 through 3, further comprising: receiving signaling from the base station indicating a configuration for a type of scheduling request corresponding to BFR messages comprising requests to adjust the parameter, the type of scheduling request comprising a type of PUCCH message; and transmitting a PUCCH message comprising a scheduling request according to the configuration for the type of scheduling request, the scheduling request comprising a request for resources for transmission of the BFR message.

Aspect 5: The method of any of aspects 1 through 4, wherein the one or more first SCells belong to a first subset of SCells of a plurality of SCells, and the first subset of SCells is associated with using BFR messages to request adjustments to the parameter.

Aspect 6: The method of aspect 5, wherein a second subset of SCells of the plurality of SCells is associated with using BFR messages to transmit BFR reports, the second subset of SCells comprising the one or more second SCells.

Aspect 7: The method of any of aspects 5 through 6, further comprising: receiving signaling from the base station indicating that the one or more first SCells belong to the first subset of SCells associated with using BFR messages to request adjustments to the parameter.

Aspect 8: The method of any of aspects 5 through 6, further comprising: selecting, at the UE, the first subset of SCells, wherein the BFR message comprises an indication that the one or more first SCells belong to the first subset of SCells associated with using BFR messages to request adjustments to the parameter.

Aspect 9: The method of any of aspects 5 through 8, wherein the BFR message comprises an indication of the one or more first SCells in a bitmap associated with the plurality of SCells or in a bitmap associated with the first subset of SCells.

Aspect 10: The method of any of aspects 1 through 9, wherein for a SCell of the one or more first SCells, the request to adjust the parameter is indicated via a single bit associated with the SCell within the BFR message, and an amount of adjustment to the parameter associated with the single bit is configured prior to transmission of the BFR message.

Aspect 11: The method of any of aspects 1 through 9, wherein for a SCell of the one or more first SCells, the request to adjust the parameter is indicated via multiple bits associated with the SCell within the BFR message, the multiple bits indicating an updated value for the parameter or an amount of adjustment to the parameter.

Aspect 12: The method of any of aspects 1 through 11, further comprising: receiving signaling from the base station indicating a first scheduling request resource corresponding to BFR messages requesting to adjust the parameter, the first scheduling request resource comprising a first PUCCH resource; and transmitting, via the first scheduling request resource, a PUCCH message comprising a scheduling request, the scheduling request comprising a request for resources for transmission of the BFR message.

Aspect 13: The method of aspect 12, further comprising: receiving signaling from the base station indicating a second scheduling request resource corresponding to BFR messages comprising BFR reports, the second scheduling request resource comprising a second PUCCH resource.

Aspect 14: The method of any of aspects 12 through 13, wherein the scheduling request comprises an indication of whether the scheduling request is associated with the BFR message, a second BFR message comprising a BFR report, or both.

Aspect 15: The method of any of aspects 1 through 14, wherein transmitting the BFR message comprises: transmitting the BFR message to a PCell, a SCell, or both.

Aspect 16: The method of any of aspects 1 through 15, further comprising: transmitting, to the base station, an indication of a quantity of SCells for which the UE supports using BFR messages to request adjustments to the parameter.

Aspect 17: The method of any of aspects 1 through 16, further comprising: transmitting an indication of a quantity of parameters for which the UE supports using BFR messages to request adjustments.

Aspect 18: The method of any of aspects 1 through 17, wherein identifying the probability of the change in the ranking of the beams comprises: using one or more machine learning models to determine the probability of the change in the ranking of the beams.

Aspect 19: A method for wireless communication at a base station, comprising: receiving, from a UE, a BFR message that comprises a request to adjust a parameter associated with a beam management procedure for one or more first SCells, the one or more first SCells different from one or more second SCells associated with using BFR messages to transmit BFR reports, wherein the BFR message is transmitted via a MAC-CE, and wherein the request to adjust the parameter is based at least in part on a probability of a change in a ranking of beams for wireless communications by the UE; and performing the beam management procedure with the UE based at least in part on the request to adjust the parameter associated with the beam management procedure.

Aspect 20: The method of aspect 19, wherein the parameter comprises: a periodicity of reporting a measurement associated with the beam management procedure; a periodicity of a reference signal resource associated with the beam management procedure; or a number of reference signal resources associated with the beam management procedure.

Aspect 21: The method of any of aspects 19 through 20, further comprising: transmitting signaling indicating that the UE is to use BFR messages to request adjustments to the parameter, wherein receiving the BFR message comprising the request to adjust the parameter is based at least in part on transmitting the signaling indicating that the UE is to use BFR messages to request adjustments to the parameter.

Aspect 22: The method of any of aspects 19 through 21, further comprising: transmitting signaling to the UE indicating a configuration for a type of scheduling request corresponding to BFR messages comprising the request to adjust the parameter, the type of scheduling request comprising a type of PUCCH message; and receiving a PUCCH message comprising a scheduling request according to the configuration for the type of scheduling request, the scheduling request comprising a request for resources for transmission of the BFR message.

Aspect 23: The method of any of aspects 19 through 22, wherein the one or more first SCells belong to a first subset of SCells of a plurality of SCells, and the first subset of second cells is associated with using BFR messages to request adjustments to the parameter.

Aspect 24: The method of aspect 23, wherein a second subset of SCells of the plurality of SCells is associated with using BFR messages to transmit BFR reports, the second subset of SCells comprising the one or more second SCells.

Aspect 25: The method of any of aspects 23 through 24, further comprising: transmitting signaling to the UE indicating that the one or more first SCells belong to the first subset of SCells associated with using BFR messages to request adjustments to the parameter.

Aspect 26: The method of any of aspects 23 through 25, wherein the BFR message comprises an indication that the one or more first SCells belong to the first subset of SCells associated with using BFR messages to request adjustments to the parameter.

Aspect 27: The method of any of aspects 23 through 26, wherein the BFR message comprises an indication of the one or more first SCells in a bitmap associated with the plurality of SCells or in a bitmap associated with the first subset of SCells.

Aspect 28: The method of any of aspects 19 through 27, wherein for a SCell of the one or more first SCells, the request to adjust the parameter is indicated via a single bit associated with the SCell within the BFR message, and an amount of adjustment to the parameter associated with the single bit is configured prior to transmission of the BFR message.

Aspect 29: The method of any of aspects 19 through 27, wherein for a SCell of the one or more first SCells, the request to adjust the parameter is indicated via multiple bits associated with the SCell within the BFR message, the multiple bits indicating an updated value for the parameter or an amount of adjustment to the parameter.

Aspect 30: The method of any of aspects 19 through 29, further comprising: transmitting signaling to the UE indicating a first scheduling request resource corresponding to BFR messages requesting to adjust the parameter, the first scheduling request resource comprising a first PUCCH resource; and receiving, via the first scheduling request resource, a PUCCH message comprising a scheduling request, the scheduling request comprising a request for resources for transmission of the BFR message.

Aspect 31: The method of aspect 30, further comprising: transmitting signaling to the UE indicating a second scheduling request resource corresponding to BFR messages comprising BFR reports, the second scheduling request resource comprising a second PUCCH resource.

Aspect 32: The method of any of aspects 30 through 31, wherein the scheduling request comprises an indication of whether the scheduling request is associated with the BFR message, a second BFR message comprising a BFR report, or both.

Aspect 33: The method of any of aspects 19 through 32, wherein receiving the BFR message comprises: receiving the BFR message at a PCell, a SCell, or both.

Aspect 34: The method of any of aspects 19 through 33, further comprising: receiving, from the UE, an indication of a quantity of SCells for which the UE supports using BFR messages to request adjustments to the parameter.

Aspect 35: The method of any of aspects 19 through 34, further comprising: receiving an indication of a quantity of parameters for which the UE supports using BFR messages to request adjustments.

Aspect 36: An apparatus comprising a memory, transceiver, and at least one processor coupled with the memory and the transceiver, the at least one processor configured to cause the apparatus to perform a method of any of aspects 1 through 18.

Aspect 37: An apparatus for wireless communication at a UE, comprising at least one means for performing a method of any of aspects 1 through 18.

Aspect 38: A non-transitory computer-readable medium storing code for wireless communication at a UE, the code comprising instructions executable by a processor to perform a method of any of aspects 1 through 18.

Aspect 39: An apparatus comprising a memory, transceiver, and at least one processor coupled with the memory and the transceiver, the at least one processor configured to cause the apparatus to perform a method of any of aspects 19 through 35.

Aspect 40: An apparatus for wireless communication at a base station, comprising at least one means for performing a method of any of aspects 19 through 35.

Aspect 41: A non-transitory computer-readable medium storing code for wireless communication at a base station, the code comprising instructions executable by a processor to perform a method of any of aspects 19 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

identifying a probability of a change in a ranking of beams for wireless communications by the UE;

transmitting, to a base station based at least in part on identifying the probability of the change in the ranking of the beams, a beam failure recovery message that comprises a request to adjust a parameter associated with a beam management procedure for one or more first secondary cells, the one or more first secondary cells different from one or more second secondary cells associated with using beam failure recovery messages to transmit beam failure recovery reports, wherein the beam failure recovery message is transmitted via a medium access control-control element; and performing the beam management procedure with the base station based at least in part on the request to adjust the parameter associated with the beam management procedure.

2. The method of claim 1, wherein the parameter comprises:

a periodicity of reporting a measurement associated with the beam management procedure;

a periodicity of a reference signal resource associated with the beam management procedure; or a number of reference signal resources associated with the beam management procedure.

3. The method of claim 1, further comprising:

receiving signaling from the base station indicating that the UE is to use beam failure recovery messages to request adjustments to the parameter, wherein transmitting the beam failure recovery message comprising the request to adjust the parameter is based at least in part on receiving the signaling indicating that the UE is to use beam failure recovery messages to request adjustments to the parameter.

4. The method of claim 1, further comprising:

receiving signaling from the base station indicating a configuration for a type of scheduling request corresponding to beam failure recovery messages comprising requests to adjust the parameter, the type of scheduling request comprising a type of physical uplink control channel message; and transmitting a physical uplink control channel message comprising a scheduling request according to the configuration for the type of scheduling request, the scheduling request comprising a request for resources for transmission of the beam failure recovery message.

5. The method of claim 1, wherein the one or more first secondary cells belong to a first subset of secondary cells of a plurality of secondary cells, and wherein the first subset of secondary cells is associated with using beam failure recovery messages to request adjustments to the parameter.

6. The method of claim 5, wherein a second subset of secondary cells of the plurality of secondary cells is associated with using beam failure recovery messages to transmit beam failure recovery reports, the second subset of secondary cells comprising the one or more second secondary cells.

7. The method of claim 5, further comprising:

receiving signaling from the base station indicating that the one or more first secondary cells belong to the first subset of secondary cells associated with using beam failure recovery messages to request adjustments to the parameter.

8. The method of claim 5, further comprising:

selecting, at the UE, the first subset of secondary cells, wherein the beam failure recovery message comprises an indication that the one or more first secondary cells belong to the first subset of secondary cells associated with using beam failure recovery messages to request adjustments to the parameter.

9. The method of claim 5, wherein the beam failure recovery message comprises an indication of the one or more first secondary cells in a bitmap associated with the plurality of secondary cells or in a bitmap associated with the first subset of secondary cells.

10. The method of claim 1, wherein for a secondary cell of the one or more first secondary cells, the request to adjust the parameter is indicated via a single bit associated with the secondary cell within the beam failure recovery message, and wherein an amount of adjustment to the parameter associated with the single bit is configured prior to transmission of the beam failure recovery message.

11. The method of claim 1, wherein for a secondary cell of the one or more first secondary cells, the request to adjust the parameter is indicated via multiple bits associated with the secondary cell within the beam failure recovery message, the multiple bits indicating an updated value for the parameter or an amount of adjustment to the parameter.

12. The method of claim 1, further comprising:

receiving signaling from the base station indicating a first scheduling request resource corresponding to beam failure recovery messages requesting to adjust the parameter, the first scheduling request resource comprising a first physical uplink control channel resource; and transmitting, via the first scheduling request resource, a physical uplink control channel message comprising a scheduling request, the scheduling request comprising a request for resources for transmission of the beam failure recovery message.

13. The method of claim 12, further comprising:

receiving signaling from the base station indicating a second scheduling request resource corresponding to beam failure recovery messages comprising beam failure recovery reports, the second scheduling request resource comprising a second physical uplink control channel resource.

14. The method of claim 12, wherein the scheduling request comprises an indication of whether the scheduling request is associated with the beam failure recovery message, a second beam failure recovery message comprising a beam failure recovery report, or both.

15. The method of claim 1, further comprising:

transmitting, to the base station, an indication of a quantity of secondary cells for which the UE supports using beam failure recovery messages to request adjustments to the parameter.

16. The method of claim 1, further comprising:

transmitting an indication of a quantity of parameters for which the UE supports using beam failure recovery messages to request adjustments.

17. The method of claim 1, wherein identifying the probability of the change in the ranking of the beams comprises:

using one or more machine learning models to determine the probability of the change in the ranking of the beams.

18. A method for wireless communication at a base station, comprising:

receiving, from a user equipment (UE), a beam failure recovery message that comprises a request to adjust a parameter associated with a beam management procedure for one or more first secondary cells, the one or more first secondary cells different from one or more second secondary cells associated with using beam failure recovery messages to transmit beam failure recovery reports, wherein the beam failure recovery message is transmitted via a medium access control-control element, and wherein the request to adjust the parameter is based at least in part on a probability of a change in a ranking of beams for wireless communications by the UE; and performing the beam management procedure with the UE based at least in part on the request to adjust the parameter associated with the beam management procedure.

19. The method of claim 18, wherein the parameter comprises:

a periodicity of reporting a measurement associated with the beam management procedure;

a periodicity of a reference signal resource associated with the beam management procedure; or a number of reference signal resources associated with the beam management procedure.

20. The method of claim 18, further comprising:

transmitting signaling indicating that the UE is to use beam failure recovery messages to request adjustments to the parameter, wherein receiving the beam failure recovery message comprising the request to adjust the parameter is based at least in part on transmitting the signaling indicating that the UE is to use beam failure recovery messages to request adjustments to the parameter.

21. The method of claim 18, further comprising:

transmitting signaling to the UE indicating a configuration for a type of scheduling request corresponding to beam failure recovery messages comprising the request to adjust the parameter, the type of scheduling request comprising a type of physical uplink control channel message; and receiving a physical uplink control channel message comprising a scheduling request according to the configuration for the type of scheduling request, the scheduling request comprising a request for resources for transmission of the beam failure recovery message.

22. The method of claim 18, wherein the one or more first secondary cells belong to a first subset of secondary cells of a plurality of secondary cells, and wherein the first subset of second cells is associated with using beam failure recovery messages to request adjustments to the parameter.

23. The method of claim 18, wherein, for a secondary cell of the one or more first secondary cells, the request to adjust the parameter is indicated via a single bit associated with the secondary cell within the beam failure recovery message, and wherein an amount of adjustment to the parameter associated with the single bit is configured prior to transmission of the beam failure recovery message.

24. The method of claim 18, wherein, for a secondary cell of the one or more first secondary cells, the request to adjust the parameter is indicated via multiple bits associated with the secondary cell within the beam failure recovery message, the multiple bits indicating an updated value for the parameter or an amount of adjustment to the parameter.

25. The method of claim 18, further comprising:

transmitting signaling to the UE indicating a first scheduling request resource corresponding to beam failure recovery messages requesting to adjust the parameter, the first scheduling request resource comprising a first physical uplink control channel resource; and receiving, via the first scheduling request resource, a physical uplink control channel message comprising a scheduling request, the scheduling request comprising a request for resources for transmission of the beam failure recovery message.

26. An apparatus for wireless communication at a user equipment (UE), comprising:

memory;

a transceiver; and at least one processor of the UE, the at least one processor coupled with the memory and the transceiver, and the at least one processor configured to cause the apparatus to:

identify a probability of a change in a ranking of beams for wireless communications by the UE;

transmit, via the transceiver and to a base station based at least in part on identifying the probability of the change in the ranking of the beams, a beam failure recovery message that comprises a request to adjust a parameter associated with a beam management procedure for one or more first secondary cells, the one or more first secondary cells different from one or more second secondary cells associated with using beam failure recovery messages to transmit beam failure recovery reports, wherein the beam failure recovery message is transmitted via a medium access control-control element; and perform the beam management procedure with the base station based at least in part on the request to adjust the parameter associated with the beam management procedure.

27. The apparatus of claim 26, the at least one processor further configured to cause the apparatus to:

receive, via the transceiver, signaling from the base station indicating that the UE is to use beam failure recovery messages to request adjustments to the parameter, wherein transmitting the beam failure recovery message comprising the request to adjust the parameter is based at least in part on receiving the signaling indicating that the UE is to use beam failure recovery messages to request adjustments to the parameter.

28. The apparatus of claim 26, the at least one processor further configured to cause the apparatus to:

receive, via the transceiver, signaling from the base station indicating a configuration for a type of scheduling request corresponding to beam failure recovery messages comprising requests to adjust the parameter, the type of scheduling request comprising a type of physical uplink control channel message; and transmit, via the transceiver, a physical uplink control channel message comprising a scheduling request according to the configuration for the type of scheduling request, the scheduling request comprising a request for resources for transmission of the beam failure recovery message.

29. The apparatus of claim 26, the at least one processor further configured to cause the apparatus to:

receive, via the transceiver, signaling from the base station indicating a first scheduling request resource corresponding to beam failure recovery messages requesting to adjust the parameter, the first scheduling request resource comprising a first physical uplink control channel resource; and transmit, via the transceiver and the first scheduling request resource, a physical uplink control channel message comprising a scheduling request, the scheduling request comprising a request for resources for transmission of the beam failure recovery message.

30. An apparatus for wireless communication at a base station, comprising:

memory;

a transceiver; and at least one processor of the base station, the at least one processor coupled with the memory and the transceiver, and the at least one processor configured to cause the apparatus to:

receive, via the transceiver and from a user equipment (UE), a beam failure recovery message that comprises a request to adjust a parameter associated with a beam management procedure for one or more first secondary cells, the one or more first secondary cells different from one or more second secondary cells associated with using beam failure recovery messages to transmit beam failure recovery reports, wherein the beam failure recovery message is transmitted via a medium access control-control element, and wherein the request to adjust the parameter is based at least in part on a probability of a change in a ranking of beams for wireless communications by the UE; and perform the beam management procedure with the UE based at least in part on the request to adjust the parameter associated with the beam management procedure.

* * * * *